(12) United States Patent
Ness

(10) Patent No.: US 7,156,645 B2
(45) Date of Patent: Jan. 2, 2007

(54) CONCRETE BLOCK MOLD WITH MOVEABLE LINER

(75) Inventor: John T. Ness, Stillwater, MN (US)

(73) Assignee: Ness Inventions, Inc., St. Paul, MN (US)

( * ) Notice: Subject to any disclaimer, the term of this patent is extended or adjusted under 35 U.S.C. 154(b) by 312 days.

(21) Appl. No.: 10/629,460

(22) Filed: Jul. 29, 2003

(65) Prior Publication Data

US 2005/0025853 A1    Feb. 3, 2005

(51) Int. Cl.
B28B 7/10    (2006.01)

(52) U.S. Cl. .................. 425/441; 425/413; 425/421

(58) Field of Classification Search ............. 425/413, 425/416, 421, 422, 441
See application file for complete search history.

(56) References Cited

U.S. PATENT DOCUMENTS

| | | | |
|---|---|---|---|
| 779,976 | A * | 1/1905 | Sterling ............... 425/441 |
| 1,993,930 | A * | 3/1935 | Hole ................. 425/424 |
| 2,304,660 | A | 12/1942 | Scott |
| 2,526,198 | A | 10/1950 | Clanton |
| 3,488,817 | A | 1/1970 | Katz |
| 3,694,128 | A | 9/1972 | Foxen |
| 4,063,866 | A | 12/1977 | Lurbiecki |
| 4,869,660 | A | 9/1989 | Ruckstuhl |
| 6,349,522 | B1 | 2/2002 | Stevens |
| 6,470,762 | B1 | 10/2002 | Burkart |
| 2003/0126821 | A1 | 7/2003 | Scherer et al. |

FOREIGN PATENT DOCUMENTS

| | | |
|---|---|---|
| DE | 308 276 C | 10/1918 |
| DE | 34 00 349 A1 | 7/1985 |
| DE | 41 40 093 A1 | 6/1993 |
| FR | 2 343 570 | 10/1977 |
| FR | 2 357 346 | 2/1978 |
| GB | 1 381 114 A | 1/1975 |
| WO | 02/051604 A1 | 7/2002 |

OTHER PUBLICATIONS

Patent Abstracts of Japan, Feb. 4, 1988, Abstract of JP63029403.
Copy of International Search Report for Application No. PCT/US2004/021608, dated Feb. 24, 2005.

* cited by examiner

*Primary Examiner*—Donald Heckenberg
(74) *Attorney, Agent, or Firm*—Dicke, Billig & Czaja, PLLC

(57) ABSTRACT

One aspect of the present invention provides a mold assembly for manufacturing concrete blocks that is adapted for use in a concrete block machine. The mold assembly comprises a plurality of liner plates and a gear drive assembly. Each liner plate has a major surface and the liner plates are configured such that the major surfaces form a mold cavity, wherein at least one of the liner plates is moveable. The gear drive assembly is selectively coupled to the at least one moveable liner plate and is configured to move the at least one moveable liner plate in a first direction toward an interior of the mold cavity by applying a force in a second direction different from the first direction, and to move the liner plate in a direction away from the interior of the mold cavity by applying a force in a direction opposite the second direction.

51 Claims, 17 Drawing Sheets

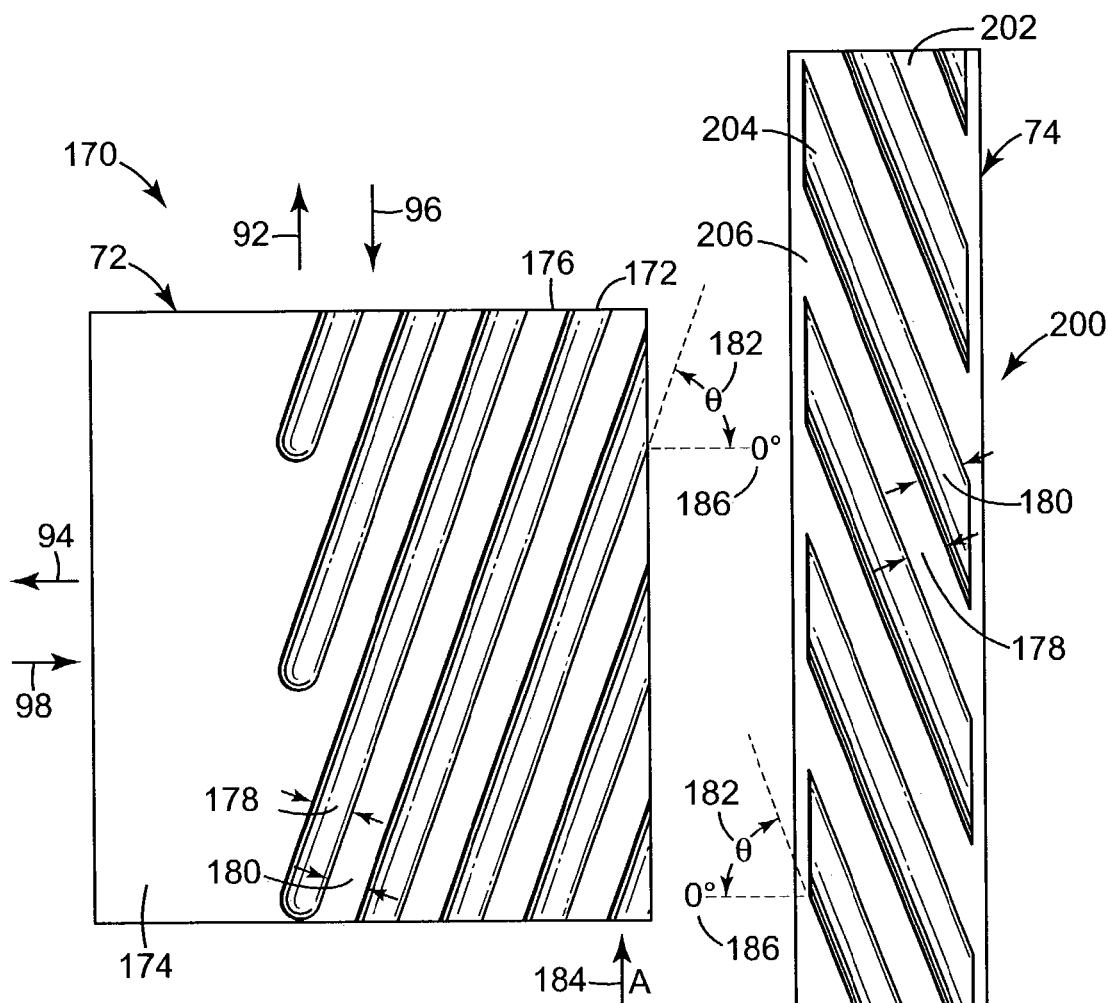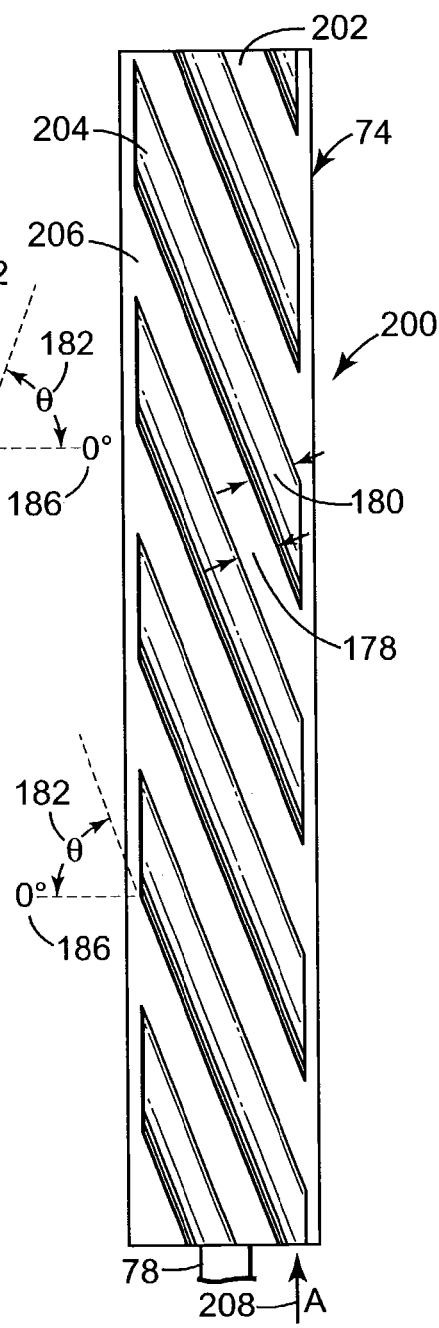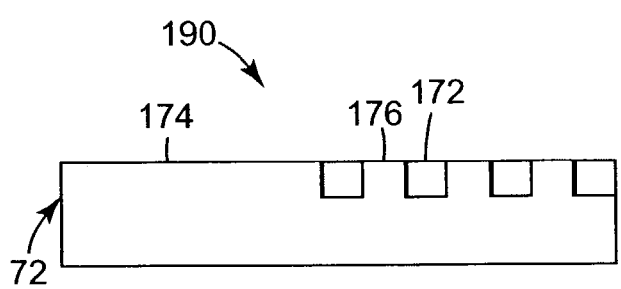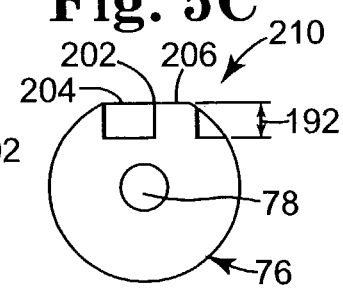
Fig. 5A
Fig. 5B
Fig. 5C
Fig. 5D

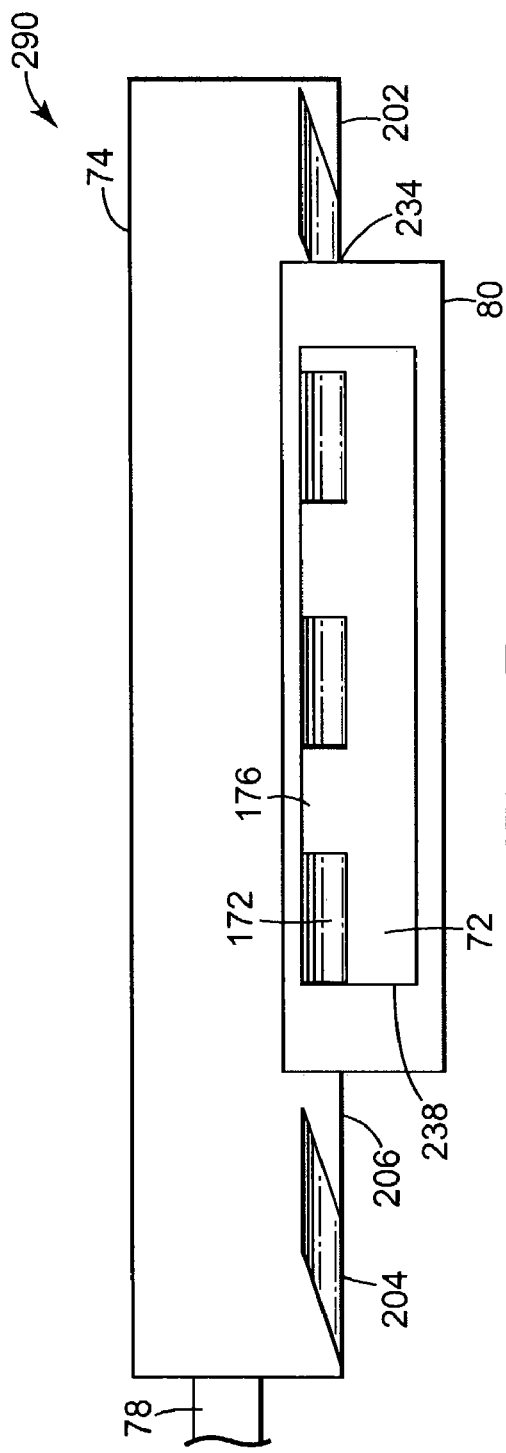
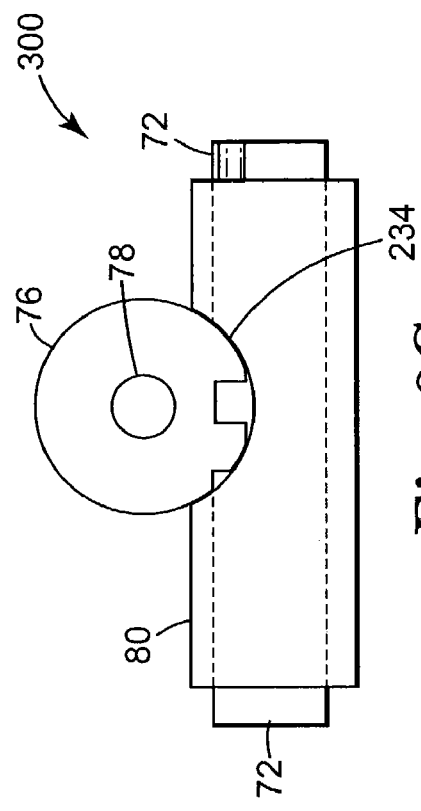
Fig. 8B
Fig. 8C

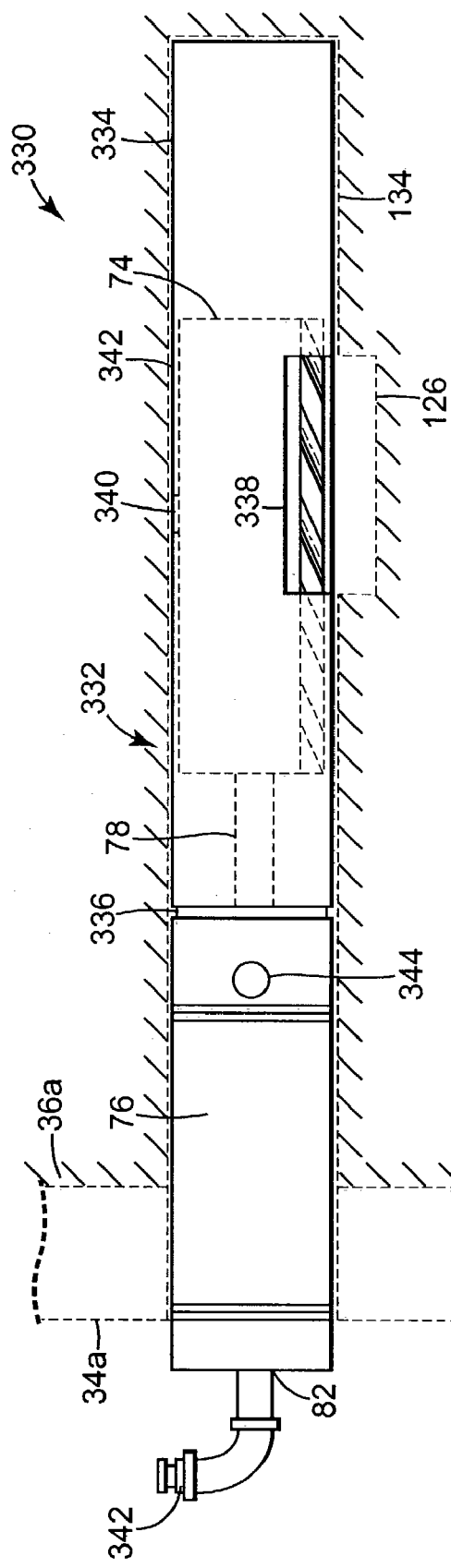
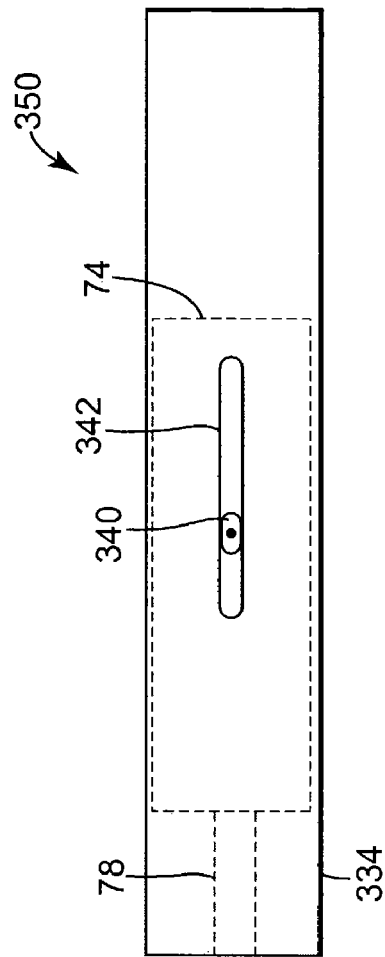
Fig. 10A
Fig. 10B

CONCRETE BLOCK MOLD WITH MOVEABLE LINER

THE FIELD OF THE INVENTION

The present invention relates to concrete block molds, and more particularly to a concrete block mold adapted for use with a concrete block machine and having at least one moveable liner.

BACKGROUND OF THE INVENTION

Concrete blocks, also referred to as concrete masonry units (CMU's), are typically manufactured by forming them into various shapes using a concrete block machine employing a mold frame assembled so as to form a mold box. A mold cavity having a negative of a desired shape of the block to be formed is provided within the mold box. A support board, or pallet, is moved via a conveyor system onto a pallet table. The pallet table is moved upward until the pallet contacts and forms a bottom of the mold box. The cavity is then filled with concrete by a moveable feedbox drawer.

As soon as the mold is filled with concrete, the feedbox drawer is moved back to a storage position and a plunger, or head shoe assembly, descends to form a top of the mold. The head shoe assembly is typically matched to the top outside surface of the mold cavity and is hydraulically or mechanically pressed down on the concrete. The head shoe assembly compresses the concrete to a desired pounds-per-square-inch (psi) rating and block dimension while simultaneously vibrating the mold along with the vibrating table, resulting in substantial compression and optimal distribution of the concrete throughout the mold cavity.

Because of the compression, the concrete reaches a level of hardness that permits immediate stripping of the finished block from the mold. To remove the finished block from the mold, the mold remains stationary while the shoe and pallet table, along with the corresponding pallet, are moved downward and force the block from the mold onto the pallet. As soon as the bottom edge of the head shoe assembly clears the bottom edge of the mold, the conveyor system moves the pallet with the finished block forward, and another pallet takes its place under the mold. The pallet table then raises the next pallet to form a bottom of the mold box for the next block, and the process is repeated.

For many types of CMU's (e.g., pavers, patio blocks, light weight blocks, cinder blocks, etc.), but for retaining wall blocks and architectural units in particular, it is desirable for at least one surface of the block to have a desired texture, such as a stone-like texture. One technique for creating a desired texture on the block surface is to provide a negative of a desired pattern or texture on the side walls of the mold. However, because of the way finished blocks are vertically ejected from the mold, any such pattern or, texture would be stripped from the side walls unless they are moved away from the mold interior prior to the block being ejected.

One technique employed for moving the sidewalls of a mold involves the use of a cam mechanism to move the sidewalls of the mold inward and an opposing spring to push the sidewalls outward from the center of the mold. However, this technique applies an "active" force to the sidewall only when the sidewall is being moved inward and relies on the energy stored in the spring to move the sidewall outward. The energy stored in the spring may potentially be insufficient to retract the sidewall if the sidewall sticks to the concrete. Additionally, the cam mechanism can potentially be difficult to utilize within the limited confines of a concrete block machine.

A second technique involves using a piston to extend and retract the sidewall. However, a shaft of the piston shaft is coupled directly to the moveable sidewall and moves in-line with the direction of movement of the moveable sidewall. Thus, during compression of the concrete by the head shoe assembly, an enormous amount of pressure is exerted directly on the piston via the piston shaft. Consequently, a piston having a high psi rating is required to hold the sidewall in place during compression and vibration of the concrete. Additionally, the direct pressure on the piston shaft can potentially cause increased wear and shorten the expected life of the piston.

SUMMARY OF THE INVENTION

One aspect of the present invention provides a mold assembly for manufacturing concrete blocks that is adapted for use in a concrete block machine. The mold assembly comprises a plurality of liner plates and a gear drive assembly. Each liner plate has a major surface and the liner plates are configured such that the major surfaces form a mold cavity, wherein at least one of the liner plates is moveable. The gear drive assembly is selectively coupled to the at least one moveable liner plate and is configured to move the at least one moveable liner plate in a first direction toward an interior of the mold cavity by applying a force in a second direction different from the first direction, and to move the liner plate in a direction away from the interior of the mold cavity by applying a force in a direction opposite the second direction.

BRIEF DESCRIPTION OF THE DRAWINGS

FIG. 5A illustrates a top view of one exemplary embodiment of a gear plate according to the present invention.

FIG. 5B illustrates an end view of the gear plate illustrated by FIG. 5A.

FIG. 5C illustrates a bottom view of one exemplary embodiment of a gear head according to the present invention.

FIG. 5D illustrates an end view of the gear head of FIG. 5C.

FIG. 8B is a side view of the illustration of FIG. 8A.

FIG. 8C is an end view of the illustration of FIG. 8A.

FIG. 10A is a diagram illustrating one exemplary embodiment of drive unit according to the present invention.

FIG. 10B is a partial top view of the drive unit of the illustration of FIG. 10A.

DESCRIPTION OF THE PREFERRED EMBODIMENTS

In the following Detailed Description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
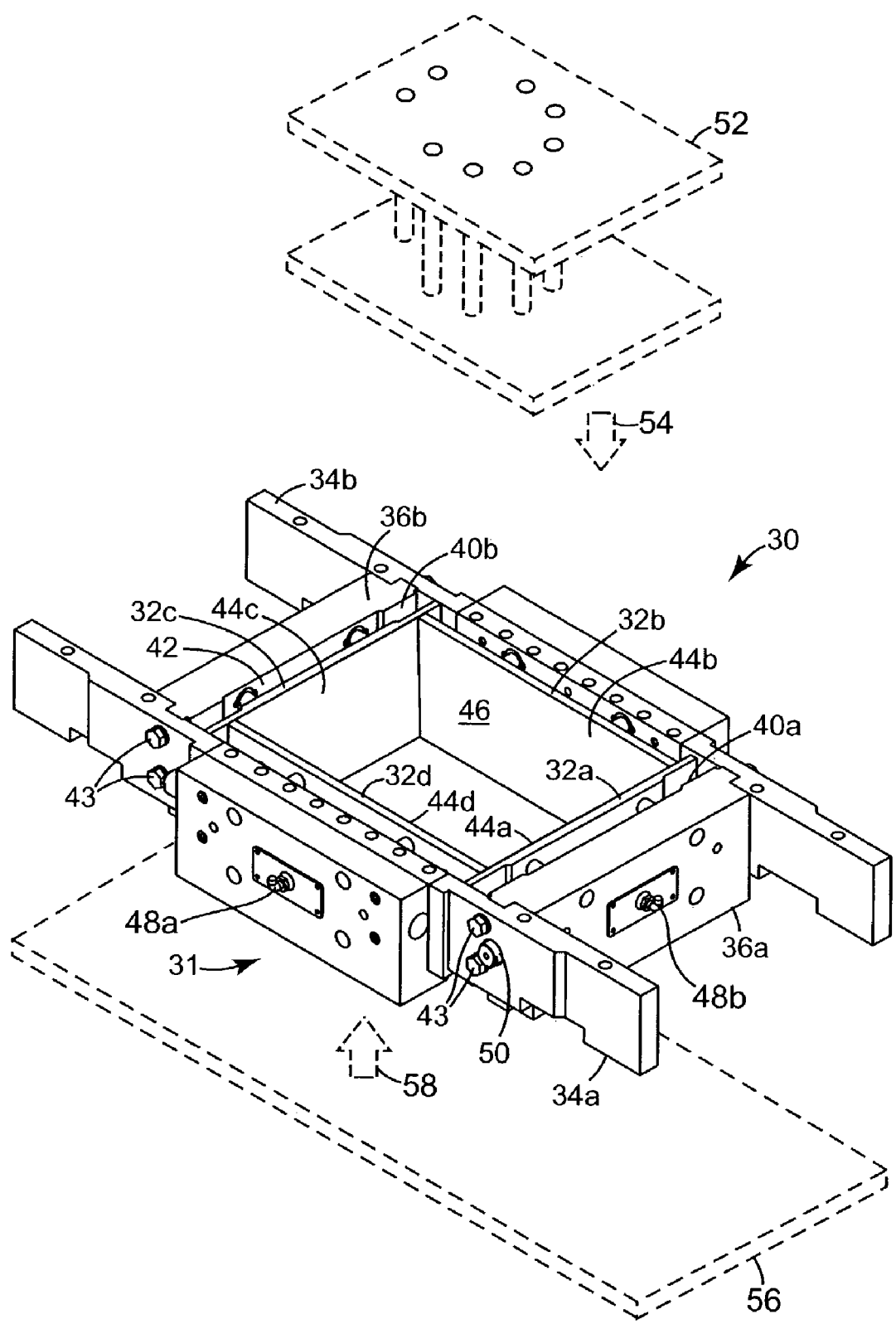
FIG. 1 is a perspective view of one exemplary embodiment of a mold assembly having moveable liner plates according to the present invention.

FIG. 1A is a perspective view of one exemplary embodiment of a mold assembly 30 having moveable liner plates 32a, 32b, 32c and 32d according to the present invention. Mold assembly 30 includes a drive system assembly 31 having side-members 34a and 34b and cross-members 36a and 36b, respectively having an inner wall 38a, 38b, 40a, and 40b, and coupled to one another such that the inner surfaces form a mold box 42. In the illustrated embodiment, cross members 36a and 36b are bolted to side members 34a and 34b with bolts 37.

Moveable liner plates 32a, 32b, 32c, and 32d, respectively have a front surface 44a, 44b, 44c, and 44d configured so as to form a mold cavity 46. In the illustrated embodiment, each liner plate has an associated gear drive assembly located internally to an adjacent mold frame member. A portion of a gear drive assembly 50 corresponding to liner plate 32a and located internally to cross-member 36a is shown extending through side-member 34a. Each gear drive assembly is selectively coupled to its associated liner plate and configured to move the liner plate toward the interior of mold cavity 46 by applying a first force in a first direction parallel to the associated cross-member, and to move the liner plate away from the interior of mold cavity 46 by applying a second force in a direction opposite the first direction. Side members 34a and 34b and cross-members 36a and 36b each have a corresponding lubrication port that extends into the member and provides lubrication to the corresponds gear elements. For example, lubrication ports 48a and 48b. The gear drive assembly and moveable liner plates according to the present invention are discussed in greater detail below.

In operation, mold assembly 30 is selectively coupled to a concrete block machine. For ease of illustrative purposes, however, the concrete block machine is not shown in FIG. 1. In one embodiment, mold assembly 30 is mounted to the concrete block machine by bolting side members 34a and 34b of drive system assembly 31 to the concrete block machine. In one embodiment, mold assembly 30 further includes a head shoe assembly 52 having dimensions substantially equal to those of mold cavity 46. Head shoe assembly 52 is also configured to selectively couple to the concrete block machine.

Liner plates 32a through 32d are first extended a desired distance toward the interior of mold box 42 to form the desired mold cavity 46. A vibrating table on which a pallet 56 is positioned is then raised (as indicated by directional arrow 58) such that pallet 56 contacts and forms a bottom to mold cavity 46. In one embodiment, a core bar assembly (not shown) is positioned within mold cavity 46 to create voids within the finished block in accordance with design requirements of a particular block.

Mold cavity 46 is then filled with concrete from a moveable feedbox drawer. Head shoe assembly 52 is then lowered (as indicated by directional arrow 54) onto mold 46 and hydraulically or mechanically presses the concrete. Head shoe assembly 52 along with the vibrating table then simultaneously vibrate mold assembly 30, resulting in a high compression of the concrete within mold cavity 46. The high level of compression fills any voids within mold cavity 46 and causes the concrete to quickly reach a level of hardness that permits immediate removal of the finished block from mold cavity 46.

The finished block is removed by first retracting liner plates 32a through 32d. Head shoe assembly 52 and the vibrating table, along with pallet 56, are then lowered (in a direction opposite to that indicated by arrow 58), while mold assembly 30 remains stationary so that head shoe assembly 56 pushes the finished block out of mold cavity 46 onto pallet 52. When a lower edge of head shoe assembly 52 drops below a lower edge of mold assembly 30, the conveyer system moves pallet 56 carrying the finished block away and a new pallet takes its place. The above process is repeated to create additional blocks.

By retracting liner plates 32a through 32b prior to removing the finished block from mold cavity 46. liner plates 32a through 32d experience less wear and, thus, have an increased operating life expectancy. Furthermore, moveable liner plates 32a through 32d also enables a concrete block to be molded in a vertical position relative to pallet 56, in lieu of the standard horizontal position, such that head shoe assembly 52 contacts what will be a "face" of the finished concrete block. A "face" is a surface of the block that will be potentially be exposed for viewing after installation in a wall or other structure.

Figure 2:
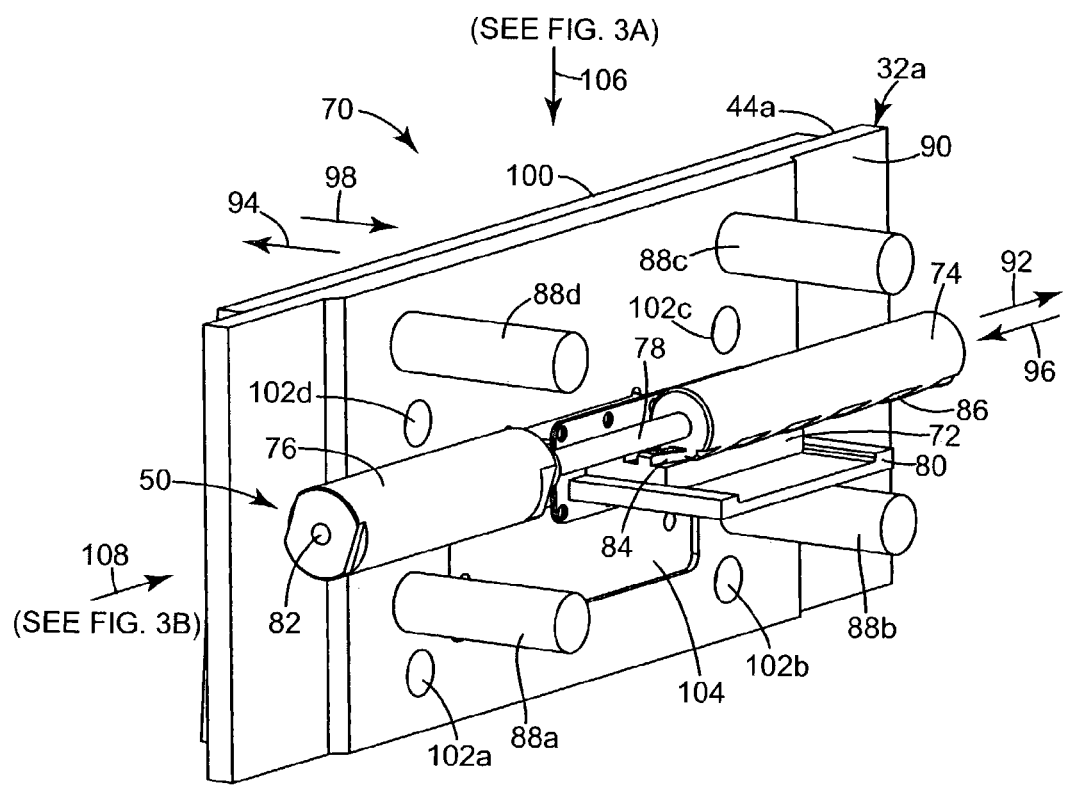
FIG. 2 is a perspective view of one exemplary embodiment of a gear drive assembly and moveable liner plate according to the present invention.

FIG. 2 is a perspective view 70 illustrating a moveable liner plate and corresponding gear drive assembly according to the present invention, such as moveable liner plate 32a and corresponding gear drive assembly 50. For illustrative purposes, side member 34a and cross-member 36 are not shown. Gear drive assembly 50 includes a first gear element 72 selectively coupled to liner plate 32a, a second gear element 74, a single rod-end double-acting pneumatic cylinder (cylinder) 76 coupled to second gear element 74 via a piston rod 78, and a gear track 80. Cylinder 76 includes an aperture 82 for accepting a pneumatic fitting. In one embodiment, cylinder 76 comprises a hydraulic cylinder. In one embodiment, cylinder 76 comprises a double rod-end dual-acting cylinder. In one embodiment, piston rod 78 is threadably coupled to second gear element 74.

In the embodiment of FIG. 2, first gear element 72 and second gear element 74 are illustrated and hereinafter referred to as a gear plate 72 and second gear element 74, respectively. However, while illustrated as a gear plate and a cylindrical gear head, first gear element 72 and second gear element 74 can be of any suitable shape and dimension.

Gear plate 72 includes a plurality of angled channels on a first major surface 84 and is configured to slide in gear track 80. Gear track 80 slidably inserts into a gear slot (not shown) extending into cross member 36a from inner wall 40a. Cylindrical gear head 74 includes a plurality of angled channels on a surface 86 adjacent to first major surface 84 of female gear plate 72, wherein the angled channels are tangential to a radius of cylindrical gear head 74 and configured to slidably mate and interlock with the angled channels of gear plate 72. Liner plate 32a includes guide posts 88a, 88b, 88c, and 88d extending from a rear surface 90. Each of the guide posts is configured to slidably insert into a corresponding guide hole (not shown) extending into cross member 36a from inner wall 40a. The gear slot and guide holes are discussed in greater detail below.

When cylinder 76 extends piston rod 78, cylindrical gear head 74 moves in a direction indicated by arrow 92 and, due to the interlocking angled channels, causes gear plate 72 and, thus, liner plate 32a to move toward the interior of mold 46 as indicated by arrow 94. It should be noted that, as illustrated, FIG. 2 depicts piston rod 78 and cylindrical gear head 74 in an extended position. When cylinder 76 retracts piston rod 78, cylindrical gear head 74 moves in a direction indicated by arrow 96 causing gear plate 72 and liner plate 32 to move away from the interior of the mold as indicated by arrow 98. As liner plate 32a moves, either toward or away from the center of the mold, gear plate 72 slides in guide track 80 and guide posts 88a through 88d slide within their corresponding guide holes.

In one embodiment, a removable liner face 100 is selectively coupled to front surface 44a via fasteners 102a, 102b, 102c, and 102d extending through liner plate 32a. Removable liner face 100 is configured to provide a desired shape and/or provide a desired imprinted pattern, including text, on a block made in mold 46. In this regard, removable liner face 100 comprises a negative of the desired shape or pattern. In one embodiment, removable liner face 100 comprises a polyurethane material. In one embodiment, removable liner face 100 comprises a rubber material. In one embodiment, removable liner plate comprises a metal or metal alloy, such as steel or aluminum. In one embodiment, liner plate 32 further includes a heater mounted in a recess 104 on rear surface 90, wherein the heater aids in curing concrete within mold 46 to reduce the occurrence of concrete sticking to front surface 44a and removable liner face 100.

Figure 3A:
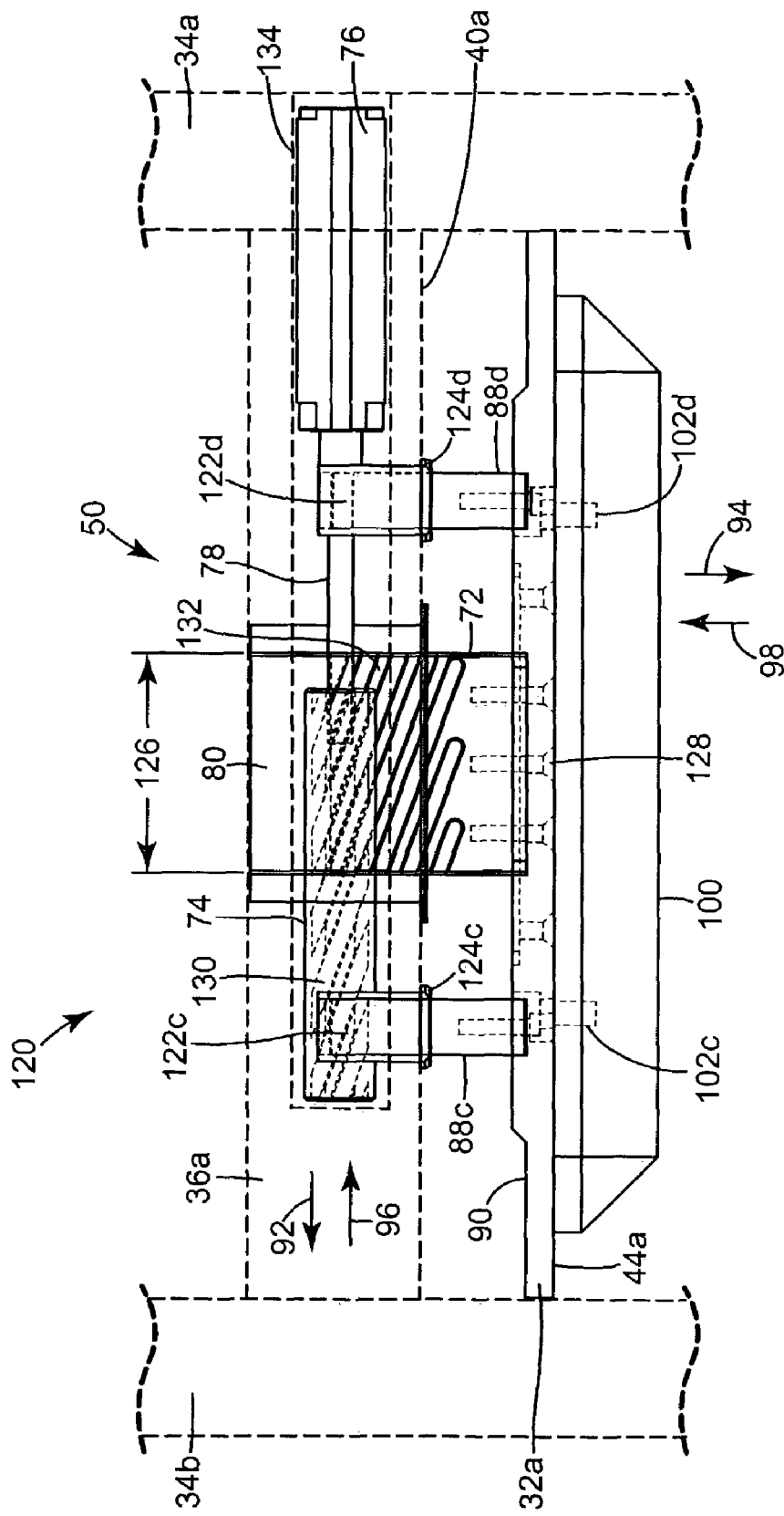
FIG. 3A is a top view of gear drive assembly and moveable liner plate as illustrated in FIG. 2.

FIG. 3A is a top view 120 of gear drive assembly 50 and liner plate 32a, as indicated by directional arrow 106 in FIG. 2. In the illustration, side members 34a and 34b, and cross member 36a are indicated dashed lines. Guide posts 88c and 88d are slidably inserted into guide holes 122c and 122d, respectively, which extend into cross member 36a from interior surface 40a. Guide holes 122a and 122b, corresponding respectively to guide posts 88a and 88b, are not shown but are located below and in-line with guide holes 122c and 122d. In one embodiment, guide hole bushings 124c and 124d are inserted into guide holes 122c and 122d, respectively, and slidably receive guide posts 88c and 88d. Guide hole bushings 124a and 124b are not shown, but are located below and in-line with guide hole bushings 124c and 124d. Gear track 80 is shown as being slidably inserted in a gear slot 126 extending through cross member 36a with gear plate 72 sliding in gear track 80. Gear plate 72 is indicated as being coupled to liner plate 32a by a plurality of fasteners 128 extending through liner plate 32a from front surface 44a.

A cylindrical gear shaft is indicated by dashed lines 134 as extending through side member 34a and into cross member 36a and intersecting, at least partially with gear slot 126. Cylindrical gear head 74, cylinder 76, and piston rod 78 are slidably inserted into gear shaft 134 with cylindrical gear head 74 being positioned over gear plate 72. The angled channels of cylindrical gear head 74 are shown as dashed lines 130 and are interlocking with the angled channels of gear plate 72 as indicated at 132.

Figure 3B:
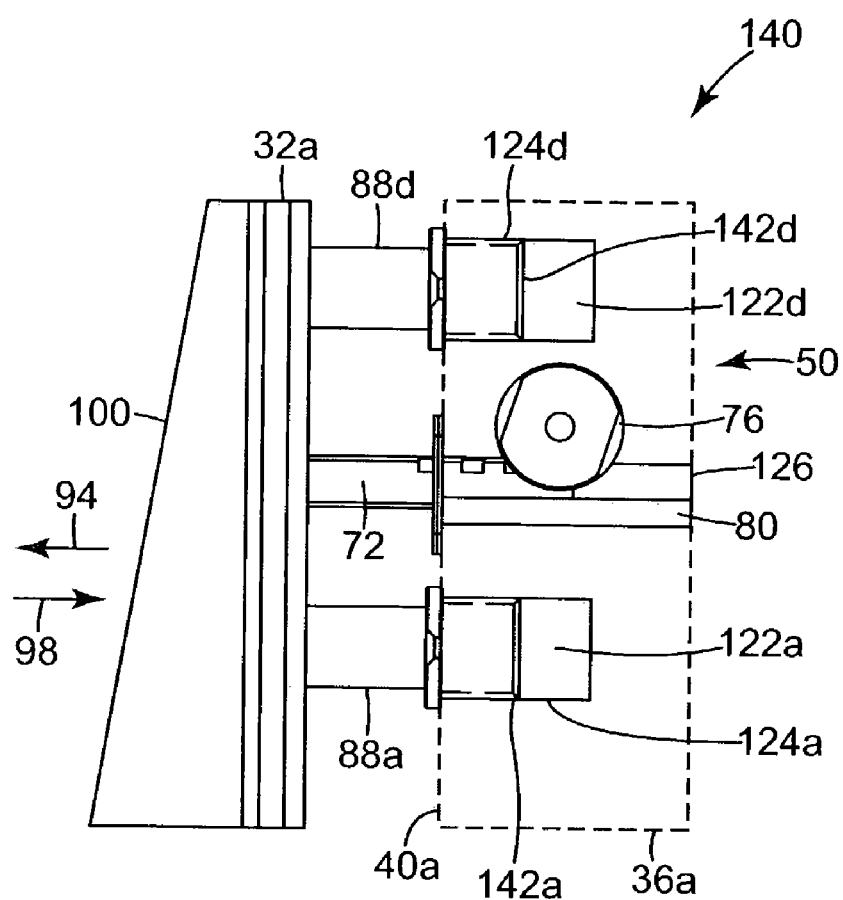
FIG. 3B is a side view of gear drive assembly and moveable liner plate as illustrated in FIG. 2.

FIG. 3B is a side view 140 of gear drive assembly 50 and liner plate 32a, as indicated by directional arrow 108 in FIG. 2. Liner plate 32a is indicated as being extended, at least partially, from cross member 36a. Correspondingly, guide posts 88a and 88d are indicated as partially extending from guide hole bushings 124a and 124d, respectively. In one embodiment, a pair of limit rings 142a and 142d are selectively coupled to guide posts 88a and 88, respectively, to limit an extension distance that liner plate 32a can be extended from cross member 36a toward the interior of mold cavity 46. Limit rings 142b and 142c corresponding respectively to guide posts 88b and 88c are not shown, but are located behind and in-line with limit rings 142a and 142d. In the illustrated embodiment, the limit rings are indicated as being substantially at an end of the guide posts, thus allowing a substantially maximum extension distance from cross member 36a. However, the limit rings can be placed at other locations along the guide posts to thereby adjust the allowable extension distance.

Figure 4B:
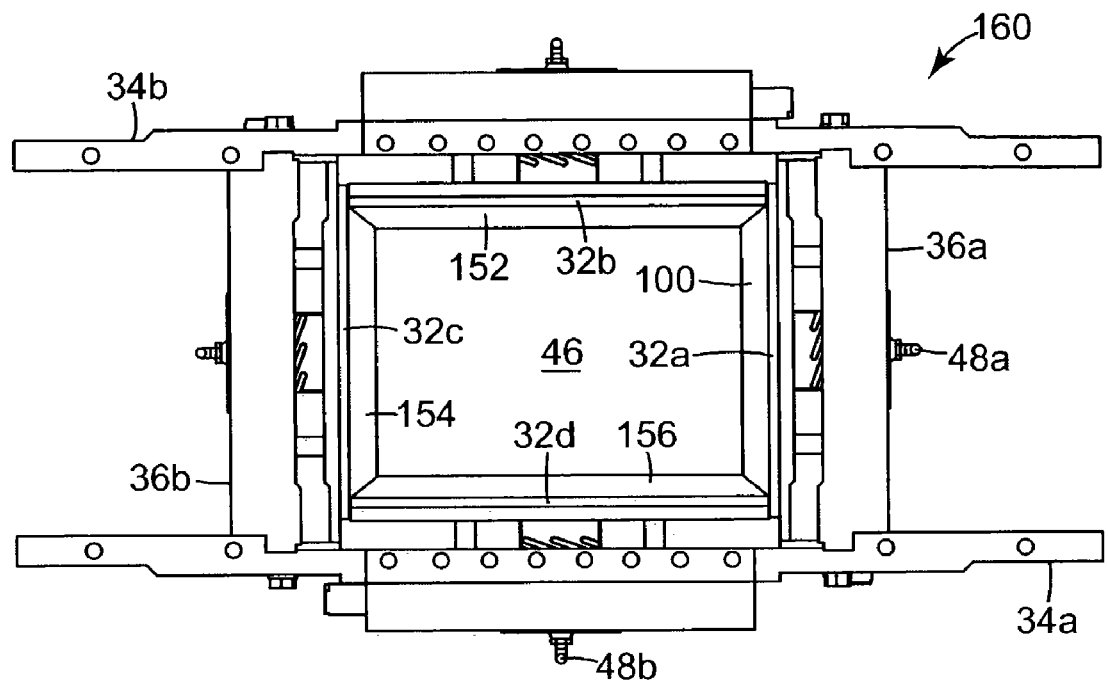
FIG. 4B is a top view of the mold assembly of FIG. 1 having the liner plates extended.
Figure 4A:
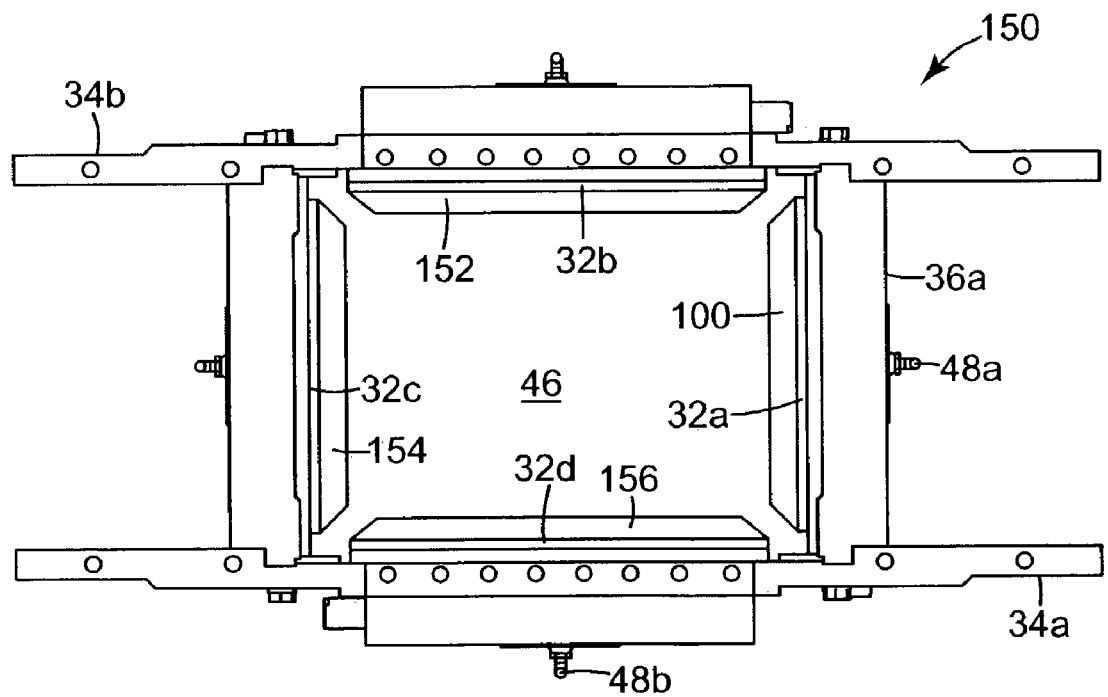
FIG. 4A is a top view of the mold assembly of FIG. 1 having the liner plates retracted.

FIG. 4A and FIG. 4B are top views 150 and 160, respectively, of mold assembly 30. FIG. 4A illustrates liner plates 32a, 32b, 32c, and 32d in a retracted positions. Liner faces 152, 154, and 154 correspond respectively to liner plates 32b, 32c, and 32d. FIG. 4B illustrates liner plates 32a, 32b, 32c, and 32d, along with their corresponding liner faces 100, 152, 154, and 156 in an extended position.

FIG. 5A is a top view 170 of gear plate 72. Gear plate 72 includes a plurality of angled channels 172 running across a top surface 174 of gear plate 72. Angled channels 172 form a corresponding plurality of linear "teeth" 176 having as a surface the top surface 174. Each angled channel 172 and each tooth 176 has a respective width 178 and 180. The angled channels run at an angle ($\Theta$) 182 from 0°, indicated at 186, across gear plate 72.

FIG. 5B is an end view ("A") 185 of gear plate 72, as indicated by directional arrow 184 in FIG. 5A, further illustrating the plurality of angled channels 172 and linear teeth 176. Each angled channel 172 has a depth 192.

FIG. 5C illustrates a view 200 of a flat surface 202 of cylindrical gear head 76. Cylindrical gear head 76 includes a plurality of angled channels 204 running across surface 202. Angled channels 204 form a corresponding plurality of linear teeth 206. The angled channels 204 and linear teeth 206 have widths 180 and 178, respectively, such that the width of linear teeth 206 substantially matches the width of angled channels 172 and the width of angled channels 204 substantially match the width of linear teeth 176. Angled channels 204 and teeth 206 run at angle (Θ) 182 from 0°, indicated at 186, across surface 202.

FIG. 5D is an end view 210 of cylindrical gear head 76, as indicated by directional arrow 208 in FIG. 5C, further illustrating the plurality of angled channels 204 and linear teeth 206. Surface 202 is a flat surface tangential to a radius of cylindrical gear head 76. Each angled channel has a depth 192 from flat surface 202.

When cylindrical gear head 76 is "turned over" and placed across surface 174 of gear plate 72, linear teeth 206 of gear head 76 mate and interlock with angled channels 172 of gear plate 72, and linear teeth 176 of gear plate 72 mate and interlock with angled channels 204 of gear head 76 (See also FIG. 2). When gear head 76 is forced in direction 92, linear teeth 206 of gear head 76 push against linear teeth 176 of gear plate 72 and force gear plate 72 to move in direction 94. Conversely, when gear head 76 is forced in direction 96, linear teeth 206 of gear head 76 push against linear teeth 176 of gear plate 72 and force gear plate 72 to move in direction 98.

In order for cylindrical gear head 76 to force gear plate 72 in directions 94 and 98, angle (Θ) 182 must be greater than 0° and less than 90°. However, it is preferable that Θ 182 be at least greater than 45°. When Θ 182 is 45° or less, it takes more force for cylindrical gear head 74 moving in direction 92 to push gear plate 72 in direction 94 than it does for gear plate 72 being forced in direction 98 to push cylindrical gear head 74 in direction 96, such as when concrete in mold 46 is being compressed. The more Θ 182 is increased above 45°, the greater the force that is required in direction 98 on gear plate 72 to move cylindrical gear head 74 in direction 96. In fact, at 90° gear plate 72 would be unable to move cylindrical gear head 74 in either direction 92 or 96, regardless of how much force was applied to gear plate 72 in direction 98. In effect, angle (Θ) acts as a multiplier to a force provided to cylindrical gear head 74 by cylinder 76 via piston rod 78. When Θ 182 is greater than 45°, an amount of force required to be applied to gear plate 72 in direction 98 in order to move cylindrical gear head 74 in direction 96 is greater than an amount of force required to be applied to cylindrical gear head 74 in direction 92 via piston rod 78 in order to "hold" gear plate 72 in position (i.e., when concrete is being compressed in mold 46).

However, the more Θ 182 is increased above 45°, the less distance gear plate 72, and thus corresponding liner plate 32a, will move in direction 94 when cylindrical gear head 74 is forced in direction 92. A preferred operational angle for Θ 182 is approximately 70°. This angle represents roughly a balance, or compromise, between the length of travel of gear plate 72 and an increase in the level of force required to be applied in direction 98 on gear plate 72 to force gear head 74 in direction 96. Gear plate 72 and cylindrical gear head 74 and their corresponding angled channels 176 and 206 reduce the required psi rating of cylinder 76 necessary to maintain the position of liner plate 32a when concrete is being compressed in mold cavity 46 and also reduces the wear experienced by cylinder 76. Additionally, from the above discussion, it is evident that one method for controlling the travel distance of liner plate 32a is to control the angle (Θ) 182 of the angled channels 176 and 206 respectively of gear plate 72 and cylindrical gear head 74.

Figure 6A:
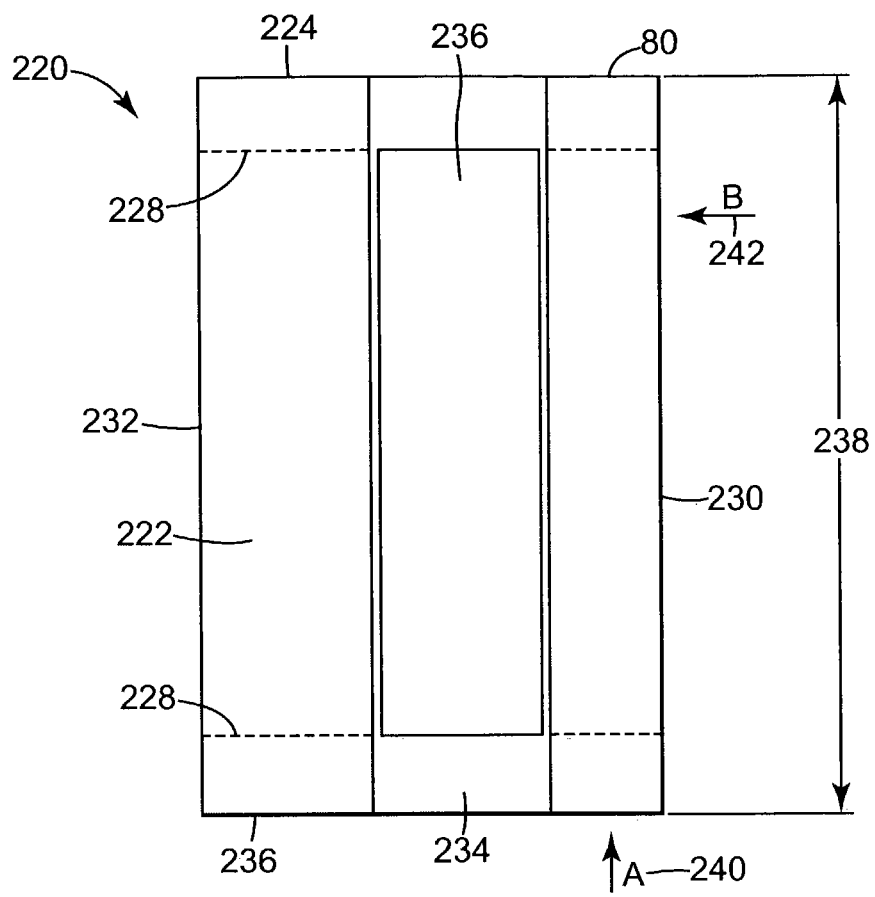
FIG. 6A is a top view of one exemplary embodiment of a gear track according to the present invention.

FIG. 6A is a top view 220 of gear track 80. Gear track 80 has a top surface 220, a first end surface 224, and a second end surface 226. A rectangular gear channel, indicated by dashed lines 228, having a first opening 230 and a second opening 232 extends through gear track 80. An arcuate channel 234, having a radius required to accommodate cylindrical gear head 76 extends across top surface 220 and forms a gear window 236 extending through top surface 222 into gear channel 228. Gear track 80 has a width 238 incrementally less than a width of gear opening 126 in side member 36a (see also FIG. 3A).

Figure 6B:
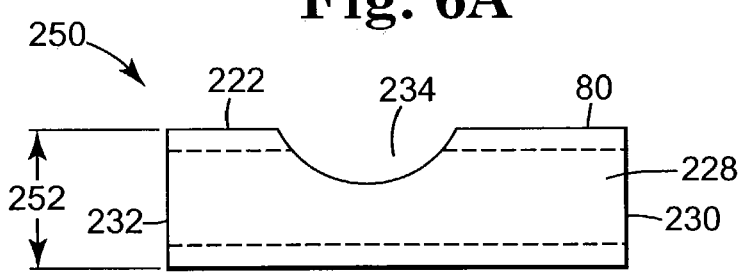
FIG. 6B is a side view of the gear track of FIG. 6A.
Figure 6C:
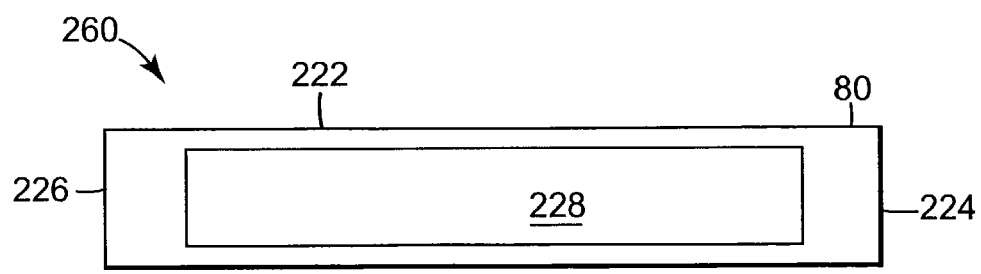
FIG. 6C is an end view of the gear track of FIG. 6A.

FIG. 6B is an end view 250 of gear track 80, as indicated by direction arrow 240 in FIG. 6A, further illustrating gear channel 228 and arcuate channel 234. Gear track 80 has a depth 252 incrementally less than height of gear opening 126 in side member 36a (see FIG. 3A). FIG. 6B is a side view 260 of gear track 80 as indicated by directional arrow 242 in FIG. 6A.

Figure 7:
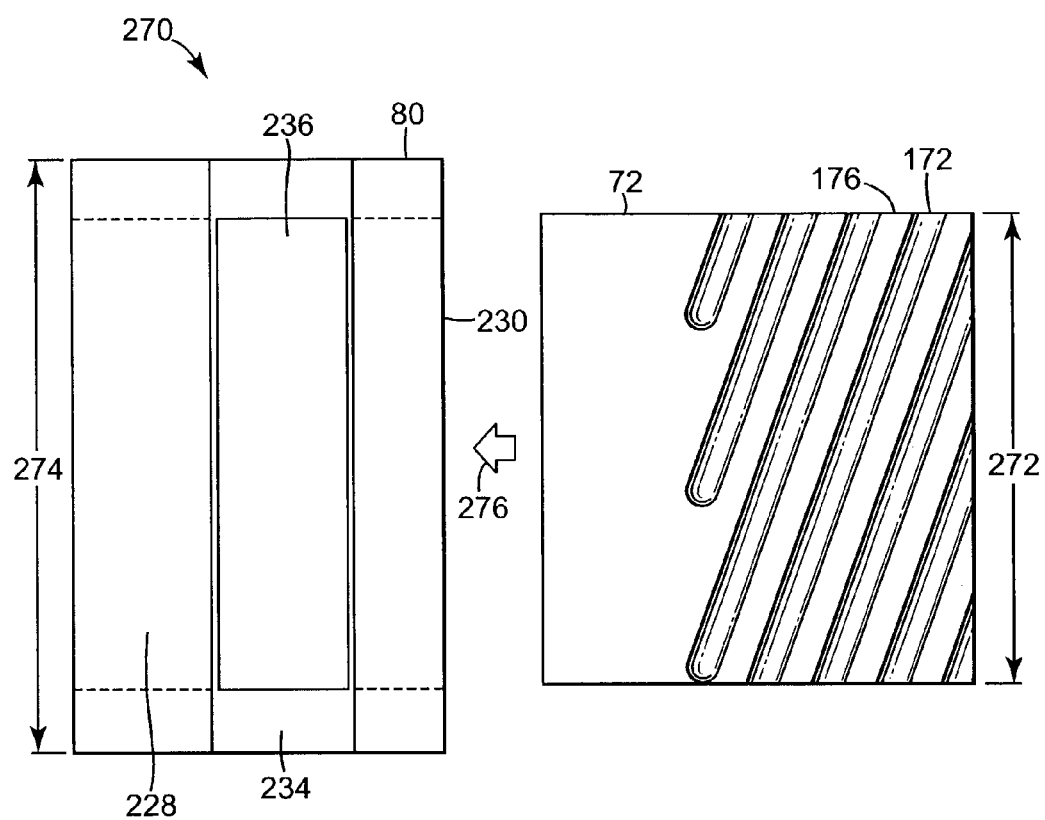
FIG. 7 is a diagram illustrating the relationship between a gear track and gear plate according to the present invention.

FIG. 7 is a top view 270 illustrating the relationship between gear track 80 and gear plate 72. Gear plate 72 has a width 272 incrementally less than a width 274 of gear track 80, such that gear plate 72 can be slidably inserted into gear channel 228 via first opening 230. When gear plate 72 is inserted within gear track 80, angled channels 172 and linear teeth 176 are exposed via gear window 236.

Figure 8A:
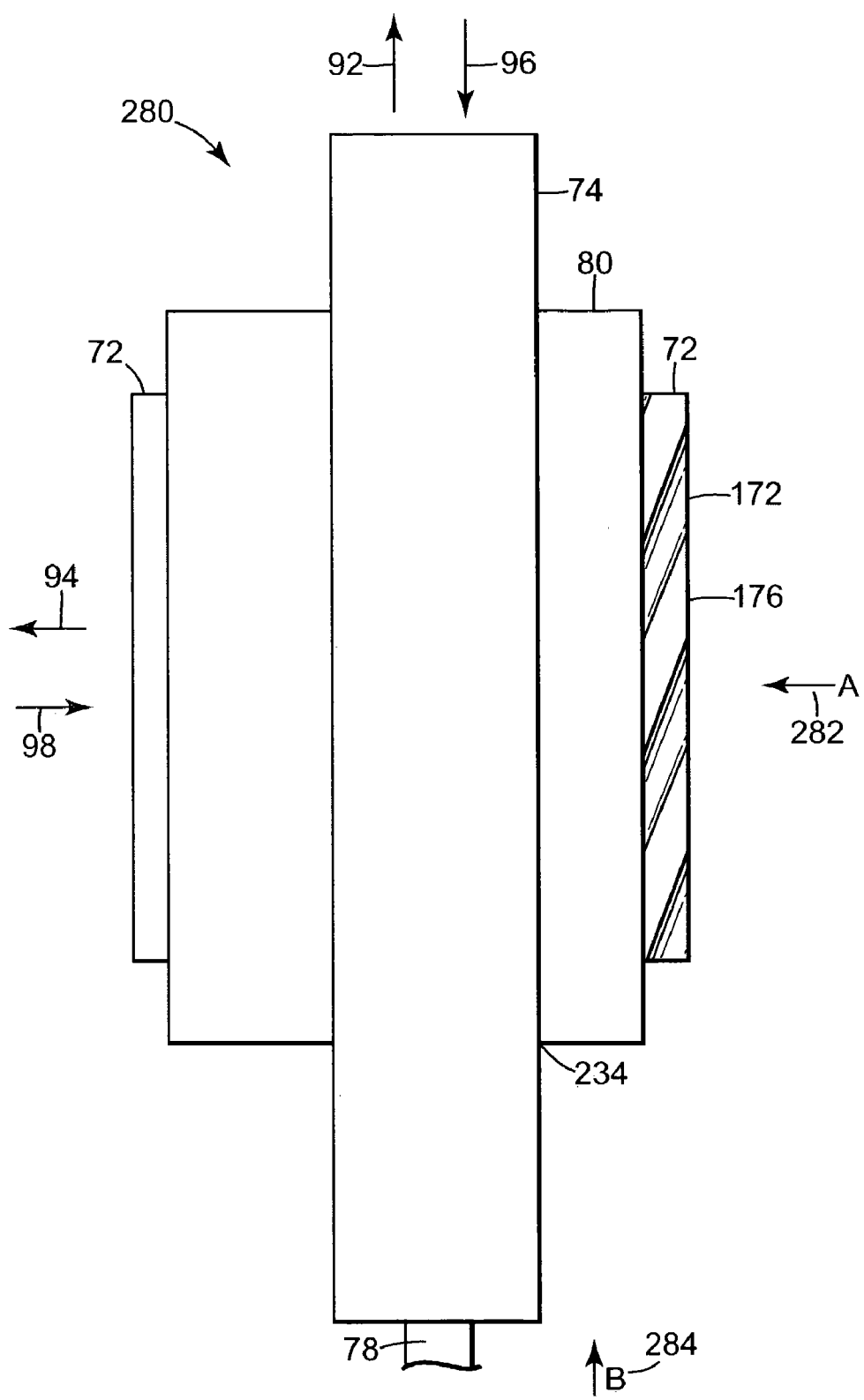
FIG. 8A is a top view illustrating the relationship between one exemplary embodiment of a gear head, gear plate, and gear track according to the present invention.

FIG. 8A is a top view 280 illustrating the relationship between gear plate 72, cylindrical gear head 74, and gear track 80. Gear plate 72 is indicated as being slidably inserted within guide track 80. Cylindrical gear head 74 is indicated as being positioned within arcuate channel 234, with the angled channels and linear teeth of cylindrical gear head 74 being slidably mated and interlocked with the angled channels 172 and linear teeth 176 of gear plate 72. When cylindrical gear head 74 is moved in direction 92 by extending piston rod 78, gear plate 72 extends outward from gear track 80 in direction 94 (See also FIG. 9B below). When cylindrical gear head 74 is moved in direction 96 by retracting piston rod 78, gear plate 72 retracts into gear track 80 in direction 98 (See also FIG. 9A below).

FIG. 8B is a side view 290 of gear plate 72, cylindrical gear head 74, and guide track 80 as indicated by directional arrow 282 in FIG. 8A. Cylindrical gear head 74 is positioned such that surface 202 is located within arcuate channel 234. Angled channels 204 and teeth 206 of cylindrical gear head 74 extend through gear window 236 and interlock with angled channels 172 and linear teeth 176 of gear plate 72 located within gear channel 228. FIG. 8C is an end view 300 as indicated by directional arrow 284 in FIG. 8A, and further illustrates the relationship between gear plate 72, cylindrical gear head 74, and guide track 80.

Figure 9A:
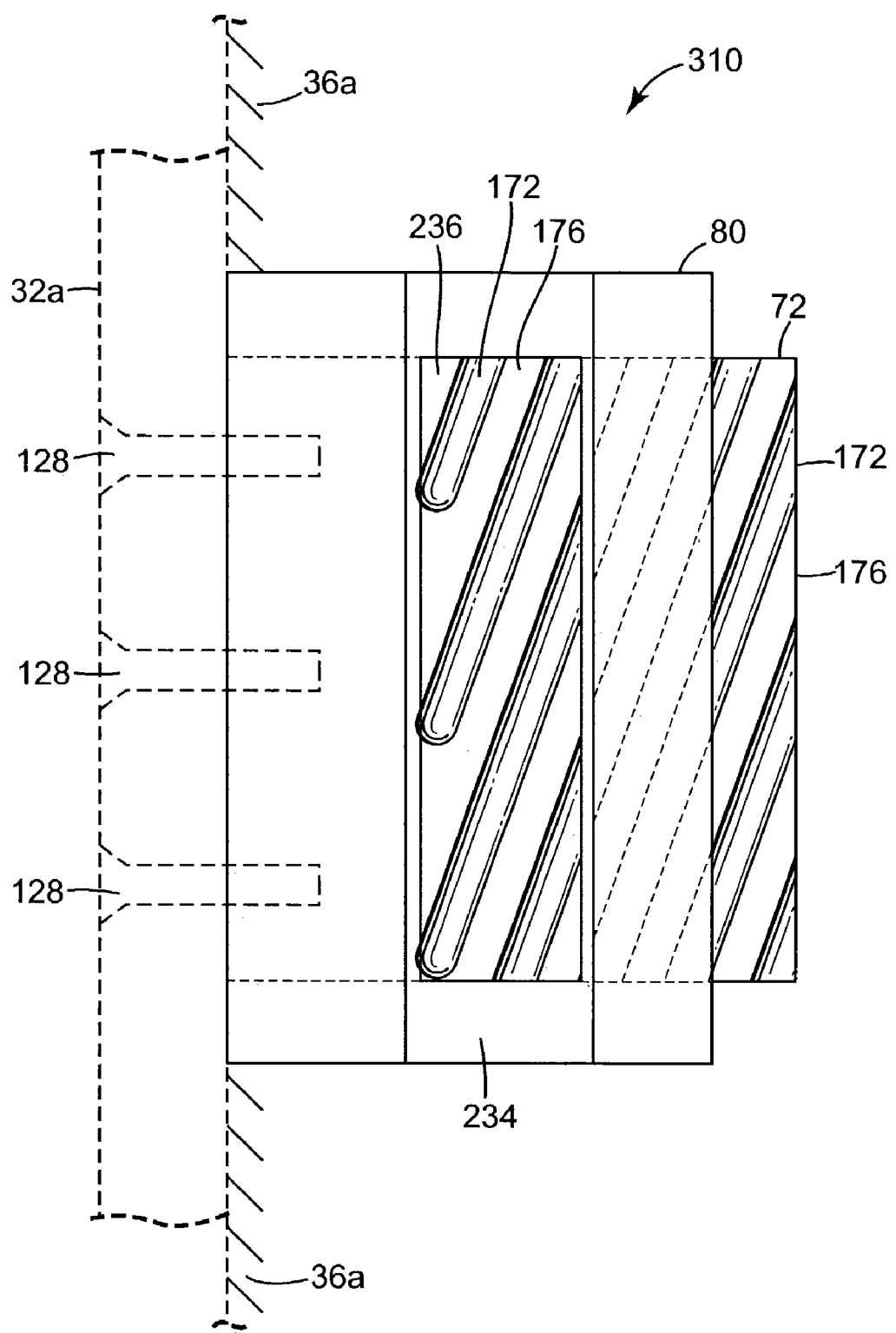
FIG. 9A is a top view illustrating one exemplary embodiment of a gear plate being in a retracted position within a gear track according to the present invention.

FIG. 9A is top view 310 illustrating gear plate 72 being in a fully retracted position within gear track 80, with liner plate 32a being retracted against cross member 36a. For purposes of clarity, cylindrical gear head 74 is not shown. Angled channels 172 and linear teeth 176 are visible through gear window 236. Liner plate 32a is indicated as being coupled to gear plate 72 with a plurality of fasteners 128 extending through liner plate 32a into gear plate 72. In one embodiment, fasteners 128 threadably couple liner plate 32a to gear plate 72.

Figure 9B:
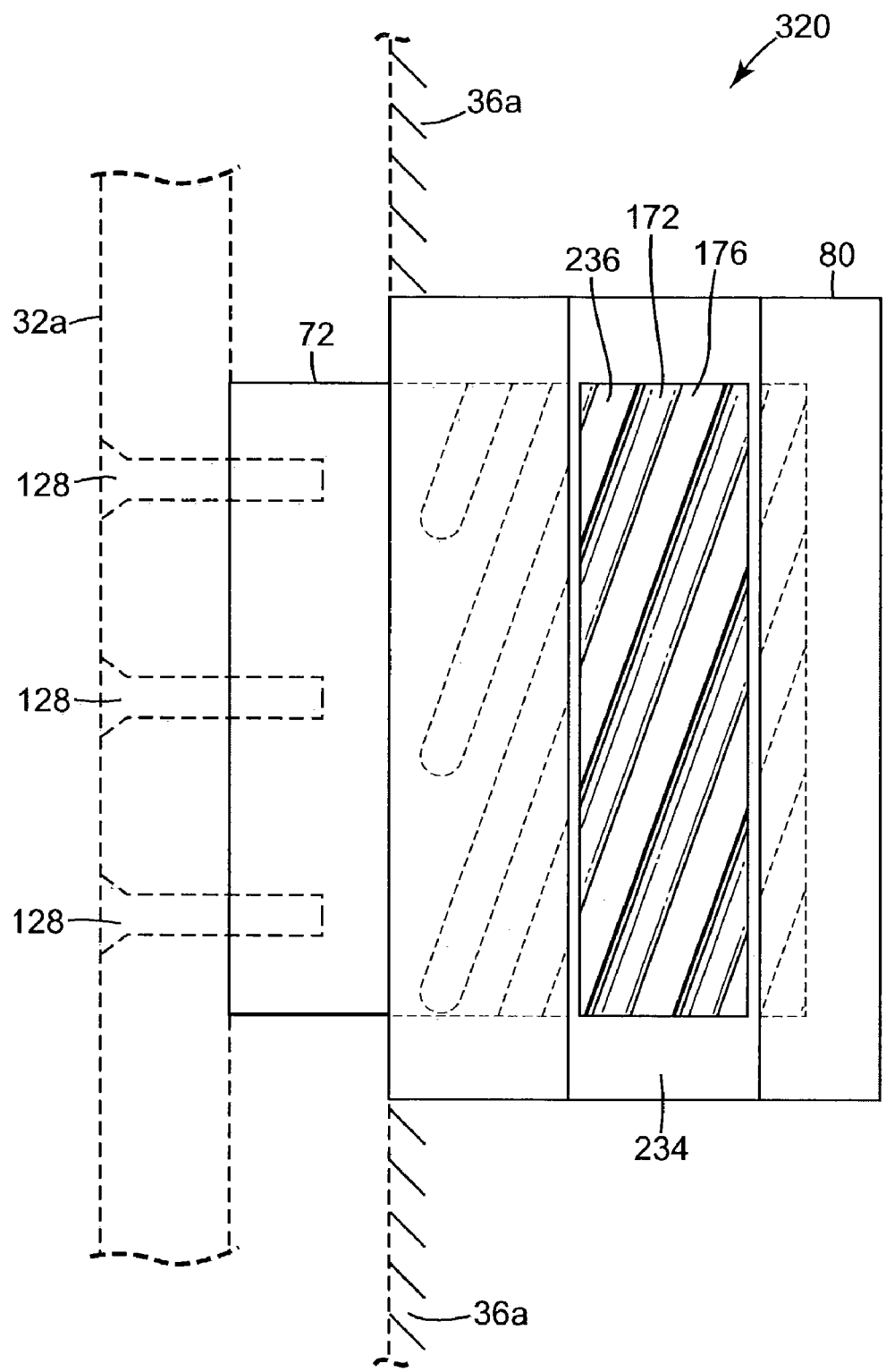
FIG. 9B is a top view illustrating one exemplary embodiment of a gear plate being in an extended position from a gear track according to the present invention.

FIG. 9B is a top view 320 illustrating gear plate 72 being extended, at least partially from gear track 80, with liner plate 32a being separated from cross member 36a. Again, cylindrical gear head 74 is not shown and angled channels 172 and linear teeth 176 are visible through gear window 236.

FIG. 10A is a diagram 330 illustrating one exemplary embodiment of a gear drive assembly 332 according to the present invention. Gear drive assembly 332 includes cylindrical gear head 74, cylinder 76, piston rod 78, and a cylindrical sleeve 334. Cylindrical gear head 74 and piston rod 78 are configured to slidably insert into cylindrical sleeve 334. Cylinder 76 is threadably coupled to cylindrical sleeve 334 with an O-ring 336 making a seal. A window 338 along an axis of cylindrical sleeve 334 partially exposes angled channels 204 and linear teeth 206. A fitting 342, such as a pneumatic or hydraulic fitting, is indicated as being threadably coupled to aperture 82. Cylinder 76 further includes an aperture 344, which is accessible through cross member 36*a*.

Gear drive assembly 332 is configured to slidably insert into cylindrical gear shaft 134 (indicated by dashed lines) so that window 338 intersects with gear slot 126 so that angled channels 204 and linear teeth 206 are exposed within gear slot 126. Gear track 80 and gear plate 72 (not shown) are first slidably inserted into gear slot 126, such that when gear drive assembly 332 is slidably inserted into cylindrical gear shaft 134 the angled channels 204 and linear teeth 206 of cylindrical gear head 74 slidably mate and interlock with the angled channels 172 and linear teeth 176 of gear plate 72.

In one embodiment, a key 340 is coupled to cylindrical gear head 74 and rides in a key slot 342 in cylindrical sleeve 334. Key 340 prevents cylindrical gear head 74 from rotating within cylindrical sleeve 334. Key 340 and key slot 342 together also control the maximum extension and retraction of cylindrical gear head 74 within cylindrical sleeve 334. Thus, in one embodiment, key 340 can be adjusted to control the extension distance of liner plate 32*a* toward the interior of mold cavity 46. FIG. 10A is a top view 350 of cylindrical shaft 334 as illustrated in FIG. 10B, and further illustrates key 340 and key slot 342.

Figure 11A:
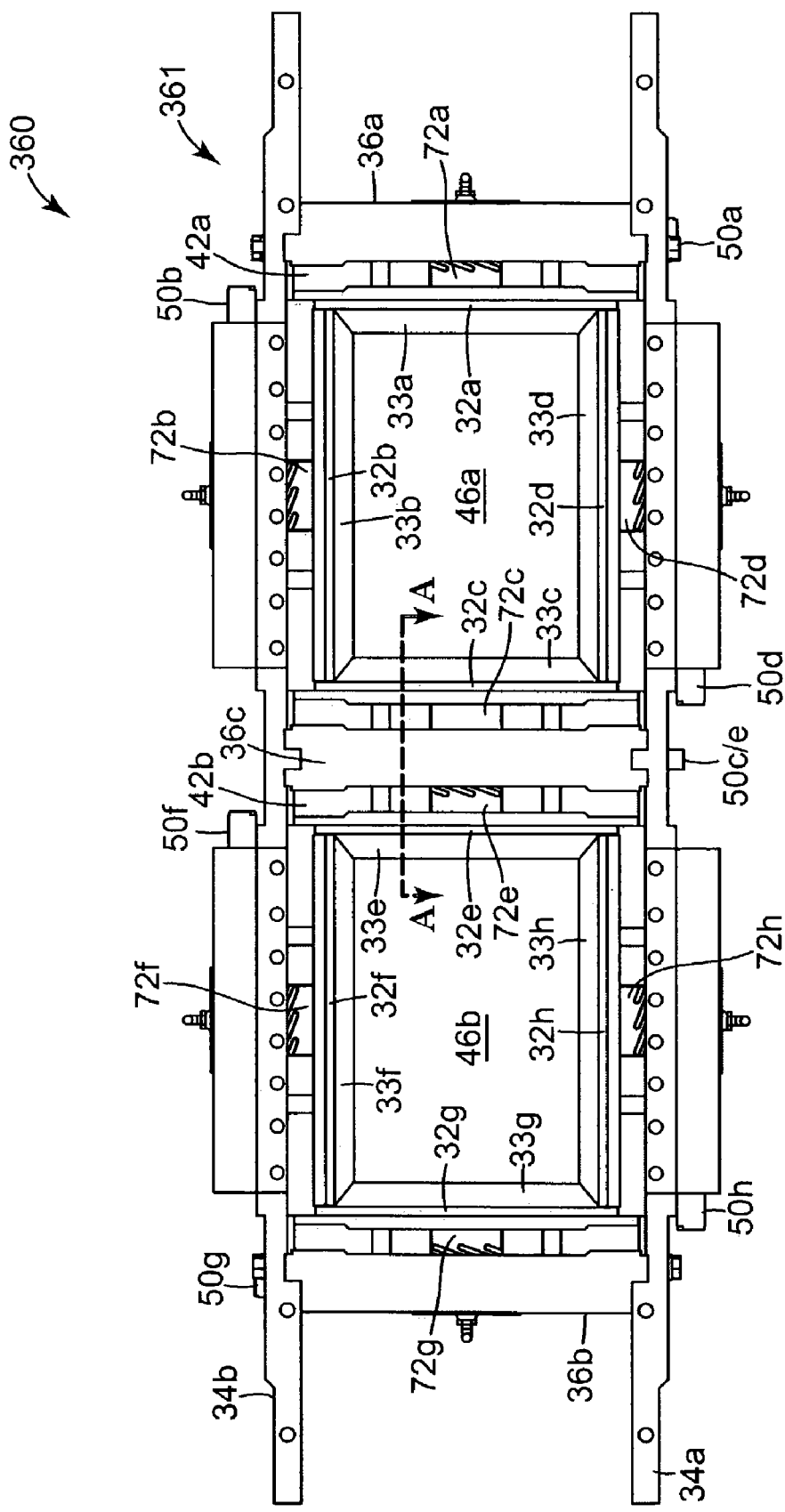
FIG. 11A is a top view illustrating one exemplary embodiment of a mold assembly according to the present invention.

FIG. 11A is a top view illustrating one exemplary embodiment of a mold assembly 360 according to the present invention for forming two concrete blocks. Mold assembly 360 includes a mold frame 361 having side members 34*a* and 34*b* and cross members 36*a* through 36*c* coupled to one another so as to form a pair of mold boxes 42*a* and 42*b*. Mold box 42*a* includes moveable liner plates 32*a* through 32*d* and corresponding removable liner faces 33*a* through 33*d* configured to form a mold cavity 46*a*. Mold box 42*b* includes moveable liner plates 32*e* through 32*h* and corresponding removable liner faces 33*e* through 33*h* configured to form a mold cavity 46*b*.

Each moveable liner plate has an associated gear drive assembly located internally to an adjacent mold frame member as indicated by 50*a* through 50*h*. Each moveable liner plate is illustrated in an extended position with a corresponding gear plate indicated by 72*a* through 72*h*. As described below, moveable liner plates 32*c* and 32*e* share gear drive assembly 50*c/e*, with gear plate 72*e* having its corresponding plurality of angled channels facing upward and gear plate 72*c* having its corresponding plurality of angled channels facing downward.

Figure 11B:
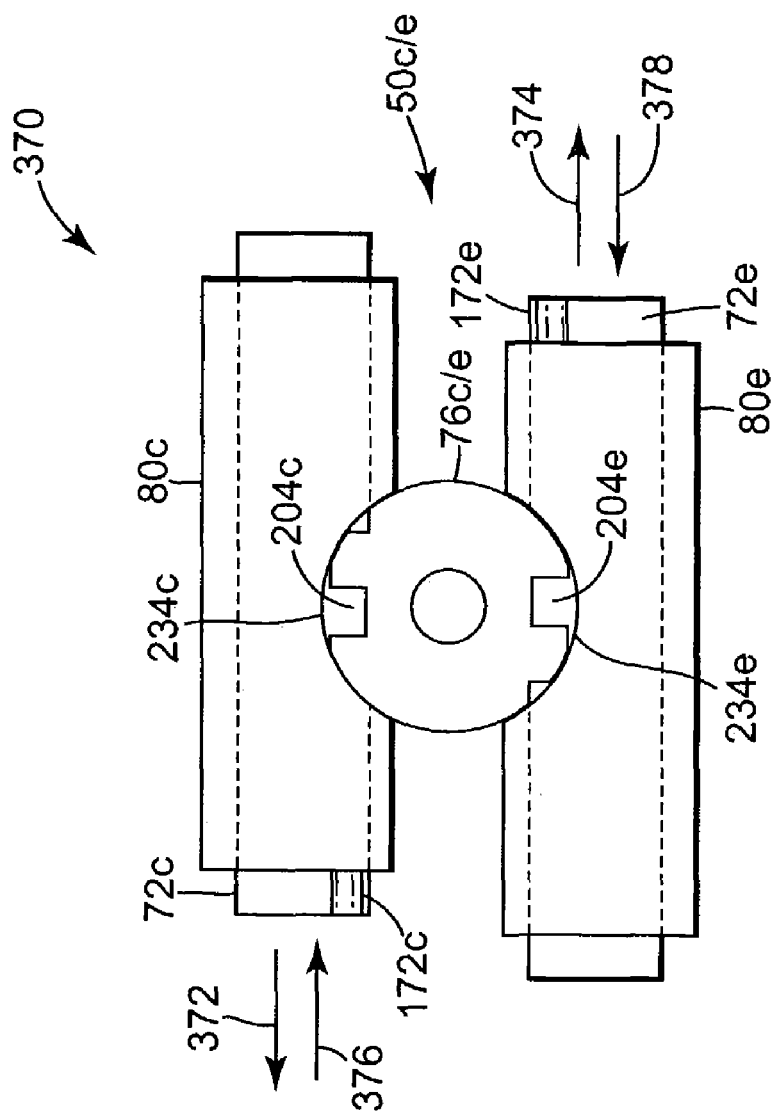
FIG. 11B is a diagram illustrating one exemplary embodiment of a gear drive assembly according to the present invention.

FIG. 11B is diagram illustrating a gear drive assembly according to the present invention, such as gear drive assembly 50*c/e*. FIG. 11B illustrates a view of gear drive assembly 50*c/e* as viewed from section A—A through cross-member 36*c* of FIG. 11A. Gear drive assembly 50*c/e* includes a single cylindrical gear head 76*c/e* having angled channels 204*c* and 204*e* on opposing surfaces. Cylindrical gear head 76*c/e* fits into arcuate channels 234*c* and 234*e* of gear tracks 80*c* and 80*d*, such that angled channels 204*c* and 204*e* slidably interlock with angled channels 172*c* and 172*e* of gear plates 72*c* and 72*e* respectively.

Angled channels 172*c* and 204*c*, and 172*e* and 204*e* oppose one another and are configured such that when cylindrical gear head 76*c/e* is extended (e.g. out from FIG. 11B) gear plate 72*c* moves in a direction 372 toward the interior of mold cavity 46*a* and gear plate 72*e* moves in a direction 374 toward the interior of mold cavity 46*b*. Similarly, when cylindrical gear head 76*c/e* is retracted (e.g. into FIG. 11B) gear plate 72*c* moves in a direction 376 away from the interior of mold cavity 46*a* and gear plate 72*e* moves in a direction 378 away from the interior of mold cavity 378. Again, cylindrical gear head 76*c/e* and gear plates 72*c* and 72*c* could be of any suitable shape.

Figure 12:
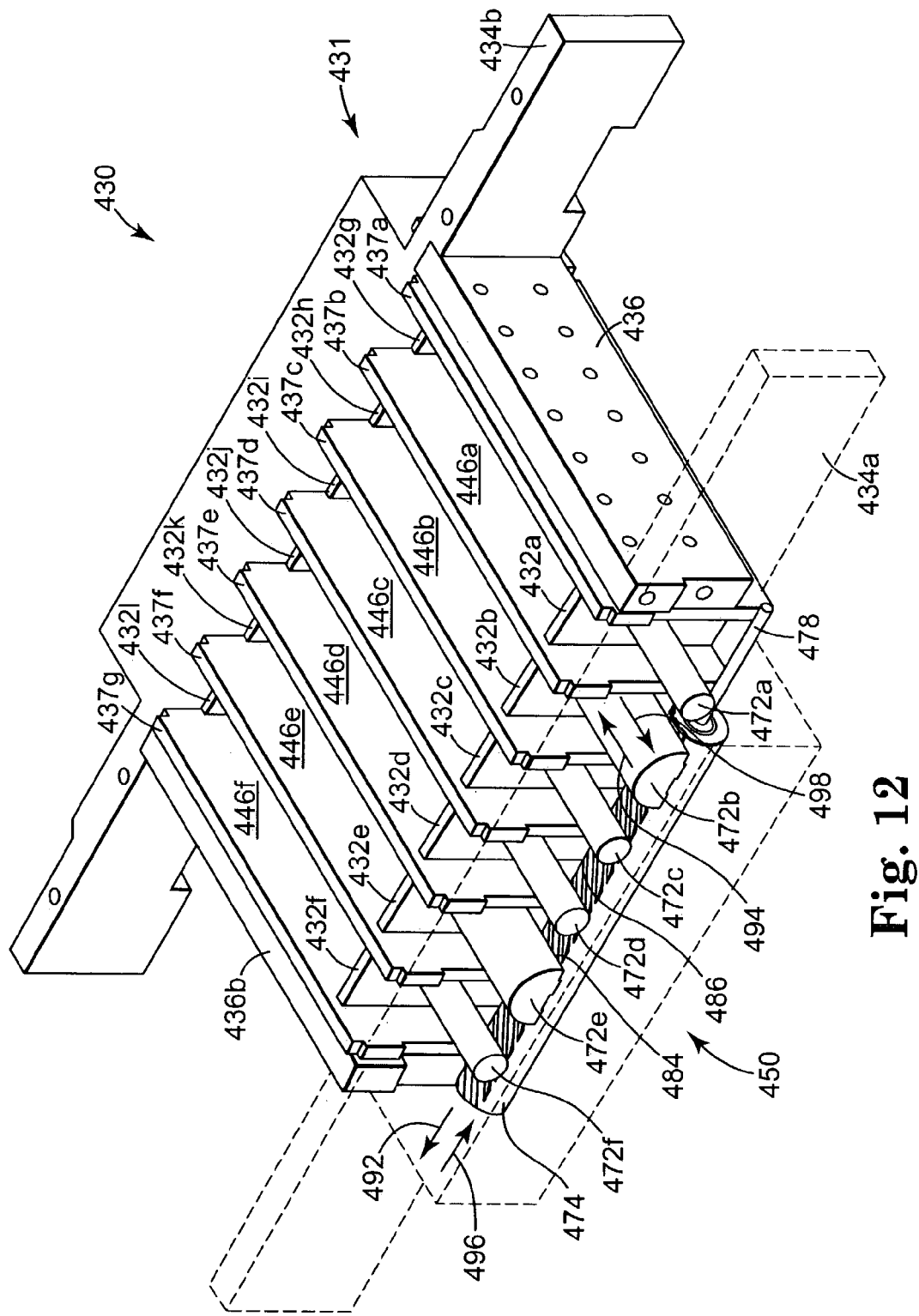
FIG. 12 is a perspective view illustrating a portion of one exemplary embodiment of a mold assembly according to the present invention.

FIG. 12 is a perspective view illustrating a portion of one exemplary embodiment of a mold assembly 430 according to the present invention. Mold assembly includes moveable liner plates 432*a* through 432*l* for simultaneously molding multiple concrete blocks. Mold assembly 430 includes a drive system assembly 431 having a side members 434*a* and 434*b*, and cross members 436*a* and 436*b*. For illustrative purposes, side member 434*a* is indicated by dashed lines. Mold assembly 430 further includes division plates 437*a* through 437*g*.

Together, moveable liner plates 432*a* through 432*l* and division plates 437*a* through 437*g* form mold cavities 446*a* through 446*f*, with each mold cavity configured to form a concrete block. Thus, in the illustrated embodiment, mold assembly 430 is configured to simultaneously form six blocks. However, it should be apparent from the illustration that mold assembly 430 can be easily modified for simultaneously forming quantities of concrete blocks other than six.

In the illustrated embodiment, side members 434*a* and 434*b* each have a corresponding gear drive assembly for moving moveable liner plates 432*a* through 432*f* and 432*g* through 432*l*, respectively. For illustrative purposes, only gear drive assembly 450 associated with side member 434*a* and corresponding moveable liner plates 432*a* through 432*g* is shown. Gear drive assembly 450 includes first gear elements 472*a* through 472*f* selectively coupled to corresponding moveable liner plates 432*a* through 432*f*, respectively, and a second gear element 474. In the illustrated embodiment, first gear elements 472*a* through 472*f* and second gear element 474 are shown as being cylindrical in shape. However, any suitable shape can be employed.

Second gear element 474 is selectively coupled to a cylinder-piston (not shown) via a piston rod 478. In one embodiment, which is described in greater detail below (see FIG. 12), second gear element 474 is integral with the cylinder-piston so as to form a single component.

In the illustrated embodiment, each first gear element 472*a* through 472*b* further includes a plurality of substantially parallel angled channels 484 that slidably mesh and interlock with a plurality of substantially parallel angled channels 486 on second gear element 474. When second gear element 474 is moved in a direction indicated by arrow 492, each of the moveable liner plates 432*a* through 432*f* moves in a direction indicated by arrow 494. Similarly, when second gear element 474 is move in a direction indicated by arrow 496, each of the moveable liner plates 432*a* through 432*f* moves in a direction indicated by arrow 498.

In the illustrated embodiment, the angled channels 484 on each of the first gear elements 432*a* through 432*f* and the angled channels 486 are at a same angle. Thus, when second gear element 474 moves in direction 492 and 496, each moveable liner plate 432*a* through 432*f* moves a same distance in direction 494 and 498, respectively. In one embodiment, second gear element 474 includes a plurality of groups of substantially parallel angled channels with each group corresponding to a different one of the first gear elements 472a through 472f. In one embodiment, the angled channels of each group and its corresponding first gear element have a different angle such that each moveable liner plate 432a through 432f move a different distance in directions 494 and 498 in response to second gear element 474 being moved in direction 492 and 496, respectively.

Figure 13:
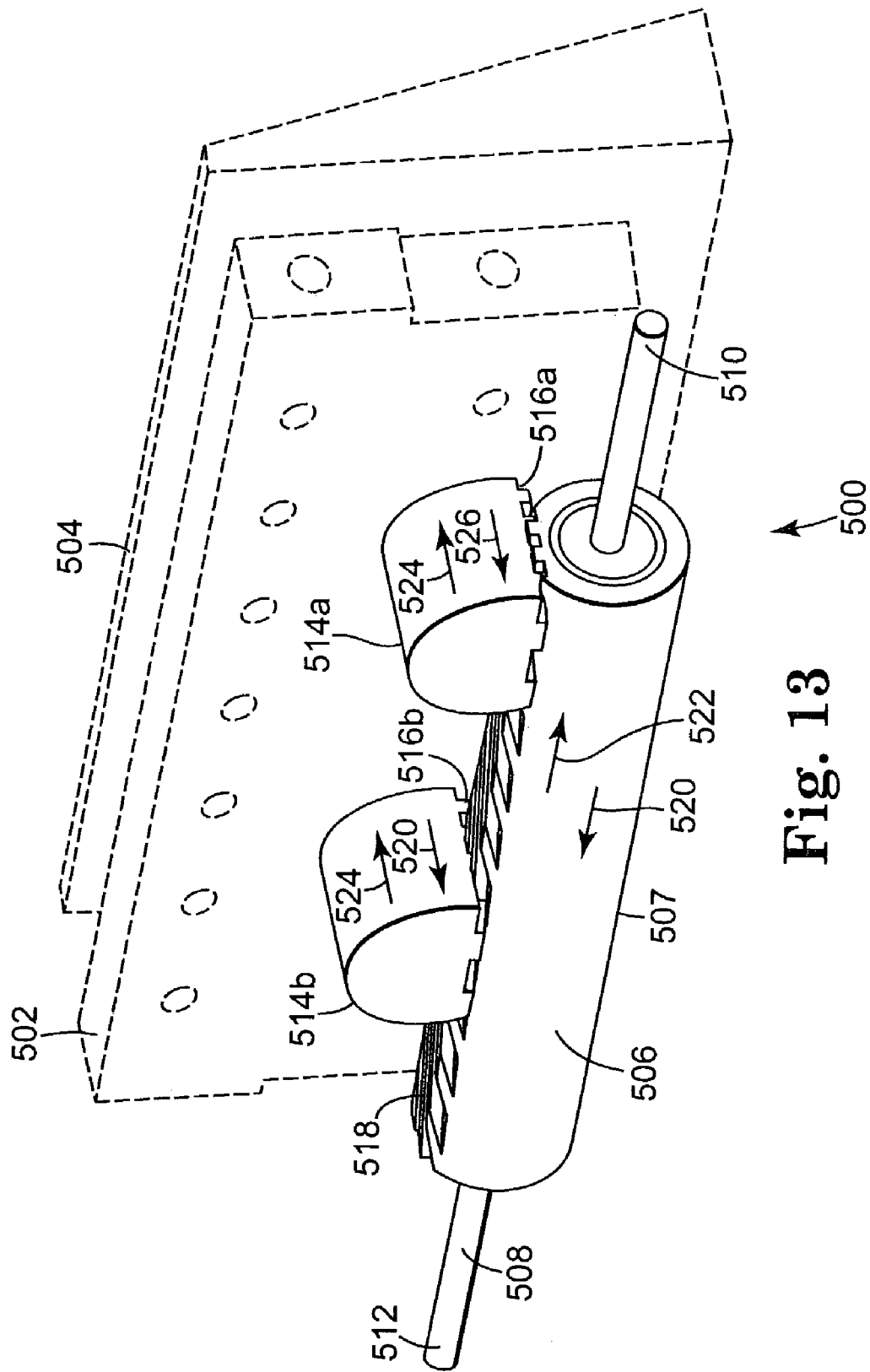
FIG. 13 is a perspective view illustrating one exemplary embodiment of a gear drive assembly according to the present invention.

FIG. 13 is a perspective view illustrating a gear drive assembly 500 according to the present invention, and a corresponding moveable liner plate 502 and removable liner face 504. For illustrative purposes, a frame assembly including side members and cross members is not shown. Gear drive assembly 500 includes double rod-end, dual-acting pneumatic cylinder-piston 506 having a cylinder body 507, and a hollow piston rod 508 with a first rod-end 510 and a second rod-end 512. Gear drive assembly 500 further includes a pair of first gear elements 514a and 514b selectively coupled to moveable liner plate 502, with each first gear element 514a and 514b having a plurality of substantially parallel angled channels 516a and 516b.

In the illustrated embodiment, cylinder body 507 of cylinder-piston 506 includes a plurality of substantially parallel angled channels 518 configured to mesh and slidably interlock with angled channels 516a and 516b. In one embodiment, cylinder body 507 is configured to slidably insert into and couple to a cylinder sleeve having angled channels 518.

In one embodiment, cylinder-piston 506 and piston rod 508 are located within a drive shaft of a frame member, such as drive shaft 134 of cross-member 36a, with rod-end 510 coupled to and extending through a frame member, such as side member 34b, and second rod-end 512 coupled to and extending through a frame member, such a side member 34a. First rod-end 510 and second rod-end 512 are configured to receive and provide compressed air to drive dual-acting cylinder-piston 506. With piston rod 508 being fixed to side members 34a and 34b via first and second rod-ends 512 and 510, cylinder-piston 506 travels along the axis of piston rod 508 in the directions as indicated by arrows 520 and 522 in response to compressed air received via first and second rod-ends 510 and 512.

When compressed air is received via second rod-end 512 and expelled via first rod-end 510, cylinder-piston 506 moves within a drive shaft, such as drive shaft 134, in direction 522 and causes first gear elements 514a and 516b and corresponding liner plate 502 and liner face 504 to move in a direction indicated by arrow 524. Conversely, when compressed air is received via first rod-end 510 and expelled via second rod-end 512, cylinder-piston 506 moves within a gear shaft, such as gear shaft 134, in direction 520 and causes first gear elements 514a and 516b and corresponding liner plate 502 and liner face 504 to move in a direction indicated by arrow 526.

In the illustrated embodiment, cylinder-piston 506 and first gear elements 514a and 514b are shown as being substantially cylindrical in shape. However, any suitable shape can be employed. Furthermore, in the illustrated embodiment, cylinder-piston 506 is a double rod-end dual-acting cylinder. In one embodiment, cylinder piston 506 is a single rod-end dual acting cylinder having only a single rod-end 510 coupled to a frame member, such as side member 34b. In such an embodiment, compressed air is provided to cylinder-piston via single rod-end 510 and a flexible pneumatic connecti cylinder-piston 506 through side member 34a via gear shaft 134. Additionally, cylinder-piston 506 comprises a hydraulic cylinder.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A mold assembly for manufacturing concrete blocks and adapted for use in a concrete block machine, the mold assembly comprising:
   a plurality of liner plates, each having a major surface, the liner plates configured such that the major surfaces form a mold cavity having a desired form; wherein at least one of the liner plates is moveable; and
   a gear drive assembly including:
      a first gear element having a plurality of substantially parallel angled channels and selectively coupled to the at least one movable liner plate;
      a second gear element having a plurality of substantially parallel angled channels configured to slidably interlock with the angled channels of the first gear element; and
      an actuator selectively coupled to the second gear element and configured to move the at least one moveable liner plate in a first direction toward an interior of the mold cavity by applying to the second gear element a force in a second direction, which is different from the first direction, causing the second gear element to move in the second direction, and the first gear element and at least one moveable liner plate to move in the first direction toward the interior of the mold cavity, and to move the first gear element and at least one moveable liner plate opposite the first direction away from the interior of the mold cavity by applying to the second gear element a force in a direction opposite the second direction.

2. The mold assembly of claim 1, wherein the first direction is toward a center of the mold cavity and the second direction is perpendicular to the first direction.

3. The mold assembly of claim 1, wherein an angle of the plurality of substantially parallel angled channels ranges between forty-five degrees and ninety degrees as measured from an axis perpendicular to the major surface of the at least one moveable liner plate and extending away from an interior of the mold cavity, wherein a ninety degree angle is substantially parallel with the major surface and a zero degree angle is substantially perpendicular to the major surface.

4. The mold assembly of claim 3, wherein a preferred angle is substantially equal to seventy degrees.

5. The mold assembly of claim 1, wherein the first gear element is plate-shaped with the plurality of substantially parallel angled channels on a first major surface.

6. The mold assembly of claim 1, wherein the first gear element is substantially cylindrical in shape with the plurality of substantially parallel angled channels on a planar surface, wherein the planar surface is substantially tangentially to a radius of the cylinder.

7. The mold assembly of claim 1, wherein the second gear element is substantially cylindrical in shape with the plurality of substantially parallel angled channels on a planar surface, wherein the planar surface is substantially tangentially to a radius of the cylinder.

8. The mold assembly of claim 1, wherein the actuator is a linear actuator.

9. The mold assembly of claim 8, wherein the actuator comprises a cylinder having a piston rod selectively coupled to the second gear element.

10. The mold assembly of claim 9, wherein the cylinder is a pneumatic cylinder.

11. The mold assembly of claim 9, wherein the cylinder is a hydraulic cylinder.

12. The mold assembly of claim 9, wherein the cylinder comprises a single rod-end double-acting cylinder.

13. The mold assembly of claim 8, wherein the linear actuator comprises a threaded drive.

14. The mold assembly of claim 1, further comprising:
a mold frame having a plurality of frame members each having a major surface and selectively coupled to one another such that the major surfaces form a mold box.

15. The mold assembly of claim 14, wherein the plurality of liner plates are located within the mold box with each liner plate corresponding to a frame member.

16. The mold assembly of claim 15, wherein the frame member corresponding to the at least one moveable liner plate includes:
a gear opening extending into the frame member from the major surface and configured to slidably receive the first gear element; and
a plurality of guide holes extending into the frame member from the major surface.

17. The mold assembly of claim 16, wherein the at least one moveable liner plate further includes a plurality of guide posts extending from a surface opposite the major surface with one guide post corresponding to each guide hole, wherein each guide post is configured to slidably insert into the corresponding guide hole.

18. The mold assembly of claim 17, further including a plurality of guide post bushings, one inserted in each guide hole such that the guide post bushing slidably receives the corresponding guide post.

19. The mold assembly of claim 16, further comprising a gear track configured to slidably insert into the gear opening and configured to slidably receive the first gear element.

20. The mold assembly of claim 16, wherein the frame member corresponding to the at least one moveable liner further includes a gear shaft extending from an end surface of the frame member and running substantially perpendicular to and at least partially intersecting with the gear opening.

21. The mold assembly of claim 20, wherein the actuator and second gear element together form a drive unit which is configured to slidably insert into the gear shaft such that the second gear element is positioned at least partially within the gear opening.

22. The mold assembly of claim 1, further comprising a liner face selectively coupled to front surface of at least one liner plate of the plurality of liner plates, wherein the liner face comprises, at least partially, a negative a desired block shape.

23. The mold assembly of claim 22, wherein the liner face includes a negative of a pattern to be imprinted on a surface of a concrete block.

24. The mold assembly of claim 22, wherein the liner face comprises a polyurethane material.

25. The mold assembly of claim 22, wherein the liner face comprises a metal or metal alloy material.

26. A mold assembly for manufacturing concrete blocks and adapted for use in a concrete block machine, the mold assembly comprising:
a mold frame comprising:
a pair of side members;
a pair of cross members selectively coupled between the side members to form a mold box; and
a plurality of division plates parallel with and between the cross members each selectively coupled between the side members to form a plurality of sub-boxes;
a pair of moveable liner values within each sub-box, one corresponding to each side member and each having a major surface such that the major surfaces and adjacent division plates form a mold cavity within each sub-box; and
a gear drive system comprising a pair of gear drive assemblies, one associated with each side member, wherein each gear drive assembly includes:
a plurality of first gear elements, each having a plurality of substantially parallel angled channels and selectively coupled to a different one of the plurality of moveable liner plates corresponding to the associated side member;
a second gear element having a plurality of substantially parallel angled channels configured to slidably interlock with the angled channels of each of the plurality of first gear elements; and
an actuator selectively coupled to the second gear element and configured to move each of the moveable liner plates of the associated side member in a first direction toward an interior of the mold cavity by applying to the second gear element a force in a second direction, which is different from the first direction, causing the second gear element and each first gear element and corresponding liner plate to move in the first direction toward the interior of the corresponding mold cavity, and to move each of the moveable liner plates of the associated side member opposite the first direction away from the interior of the corresponding mold cavity by applying to the second gear element a force in a direction opposite the second direction.

27. The mold assembly of claim 26, wherein the first direction is toward a center of the mold cavity and the second direction is perpendicular to the first direction.

28. The mold assembly of claim 26, wherein the gear drive system is configured to simultaneously move each moveable liner plate a same distance.

29. The mold assembly of claim 26, wherein the gear drive system is configured to simultaneously move the moveable line plates different distances.

30. The mold assembly of claim 26, wherein the second gear element comprises a plurality of groups of substantially parallel angled channels, each group of angled channels corresponding to and configured to slidably interlock with the angled channels of a different one of the first gear elements of the plurality of first gear elements.

31. The mold assembly of claim 30, wherein an angle of the plurality of substantially parallel angled channels ranges between forty-five degrees and ninety degrees as measured from an axis perpendicular to the major surface of the liner plate and extending away from the interior of the mold cavity, wherein a ninety degree angle is substantially parallel with the major surface and a zero degree angle is substantially perpendicular to the major surface.

32. The mold assembly of claim 31, wherein a preferred angle is substantially equal to seventy degrees.

33. The mold assembly of claim 31, wherein the angle of the substantially parallel angled channels of each group of the second gear element is substantially equal to the angle of the substantially parallel angled channels of its corresponding first gear element and wherein the angle of the substantially parallel angled channels varies from group to group such that the moveable liner plates will move a different distance toward the interior of the correspond mold cavity in response to the second force being applied to the second gear element.

34. The mold assembly of claim 26, wherein each first gear element is a rectangular plate with the plurality of angled channels on a first major surface.

35. The mold assembly of claim 26, wherein each first gear element is substantially cylindrical with the plurality of substantially parallel angled channels on a planar surface, wherein the planar surface is substantially tangential to a radius of the cylindrical.

36. The mold assembly of claim 26, wherein the second gear element is substantially cylindrical with the plurality of substantially parallel angled channels on a planar surface, wherein the planar surface is substantially tangential to a radius of the cylindrical.

37. The mold assembly of claim 26, wherein the actuator is a linear actuator.

38. The mold assembly of claim 37, wherein the actuator comprises a piston having a piston rod selectively coupled to the second gear element.

39. The mold assembly of claim 38, wherein the piston is a hydraulic piston.

40. The mold assembly of claim 38, wherein the piston is a pneumatic piston.

41. The mold assembly of claim 37, wherein the actuator comprises a threaded drive.

42. The mold assembly of claim 26, wherein each side member includes a plurality of gear openings, one associated with each sub-box and each configured to slidably receive a first gear element of a corresponding moveable liner plate.

43. The mold assembly of claim 42, further including a plurality of gear tracks each configured to slidably insert into a different one of the plurality of gear openings and configured to slidably receive a first gear element.

44. The mold assembly of claim 26, wherein each side member includes a plurality of guide holes associated with each sub-box.

45. The mold assembly of claim 44, wherein the pair of moveable liner plates associated with each sub-box each have a plurality of guide posts extending from a surface opposite the major surface, wherein each guide post is configured to slidably insert into a different one of the plurality of guide holes.

46. The mold assembly of claim 45, further comprising a plurality of guide post bushings, one inserted into each of the plurality of guide holes and configured to slidably receive a corresponding guide post.

47. The mold assembly of claim 26, further comprising a liner face selectively coupled to the major surface of at least one of the moveable liner plates.

48. The mold assembly of claim 47, wherein the liner face comprises, at least partially, a negative of a desired block shape.

49. The mold assembly of claim 47, wherein the liner face comprises a negative of a desired pattern to be imprinted on a surface of a concrete block.

50. The mold assembly of claim 47, wherein the liner face comprises a polyurethane material.

51. The mold assembly of claim 47, wherein the liner face comprises a metal alloy.

* * * * *

UNITED STATES PATENT AND TRADEMARK OFFICE
CERTIFICATE OF CORRECTION

| | |
|---|---|
| PATENT NO. | : 7,156,645 B2 |
| APPLICATION NO. | : 10/629460 |
| DATED | : January 2, 2007 |
| INVENTOR(S) | : John T. Ness |

It is certified that error appears in the above-identified patent and that said Letters Patent is hereby corrected as shown below:

Cover page, U.S. PATENT DOCUMENTS, delete "12/1942" and insert in place thereof --12/1940--.

Column 1, line 56, delete "or," and insert in place thereof --or--.

Column 4, line 7, delete "corresponds" and insert in place thereof --corresponding--.

Column 4, line 53, delete "32b" and insert in place thereof --32d--.

Column 4, line 54, delete "46." and insert in place thereof --46--.

Column 4, line 62, delete "be potentially be" and insert in place thereof --potentially be--.

Column 6, line 32, delete "88" and insert in place thereof --88d--.

Column 6, line 47, delete second "154" and insert in place thereof --156--.

Column 10, line 10, delete second "72c" and insert in place thereof --72e--.

Column 10, line 14, delete "4321" and insert in place thereof --432*1*--.

Column 10, line 21, delete "4321" and insert in place thereof --432*1*--.

Column 10, line 56, delete "move" and insert in place thereof --moved--.

Column 11, line 63, delete "connecti" and insert in place thereof --connection made to--.

UNITED STATES PATENT AND TRADEMARK OFFICE
CERTIFICATE OF CORRECTION

PATENT NO. : 7,156,645 B2
APPLICATION NO. : 10/629460
DATED : January 2, 2007
INVENTOR(S) : John T. Ness It is certified that error appears in the above-identified patent and that said Letters Patent is hereby corrected as shown below:

Column 12, line 31, Claim 1, delete "direction," and insert in place thereof --direction--.

Column 13, line 54, Claim 22, delete "negative" and insert in place thereof --negative of--.

Column 14, line 6, Claim 26, delete "values" and insert in place thereof --plates--.

Signed and Sealed this

Thirteenth Day of May, 2008

JON W. DUDAS
*Director of the United States Patent and Trademark Office*